Dec. 5, 1939.  C. L. LEE  2,181,975
ACCOUNTING MACHINE
Filed Oct. 14, 1935   11 Sheets-Sheet 1

Inventor
Charles L. Lee, Deceased
By Leefe Jane Lee, Executrix
By
Pearl Benst
Her Attorney Dec. 5, 1939.  C. L. LEE  2,181,975
ACCOUNTING MACHINE
Filed Oct. 14, 1935  11 Sheets-Sheet 2

Inventor
Charles L. Lee, Deceased
By Leefe Jane Lee, Executrix
By
Her Attorney

Dec. 5, 1939. C. L. LEE 2,181,975
ACCOUNTING MACHINE
Filed Oct. 14, 1935 11 Sheets-Sheet 3
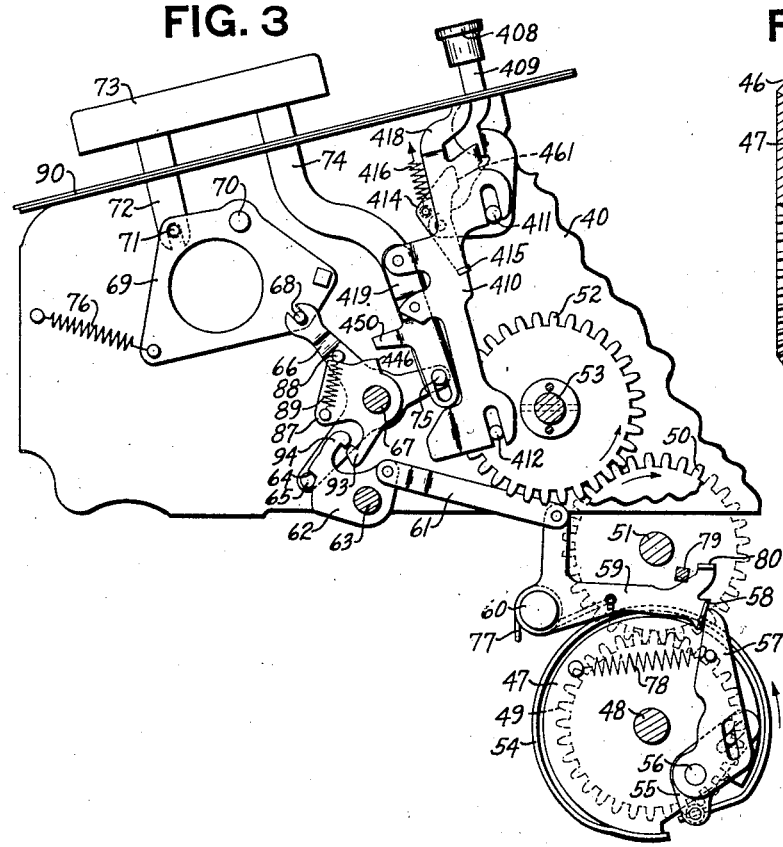
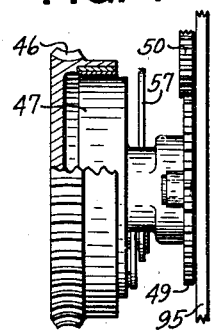
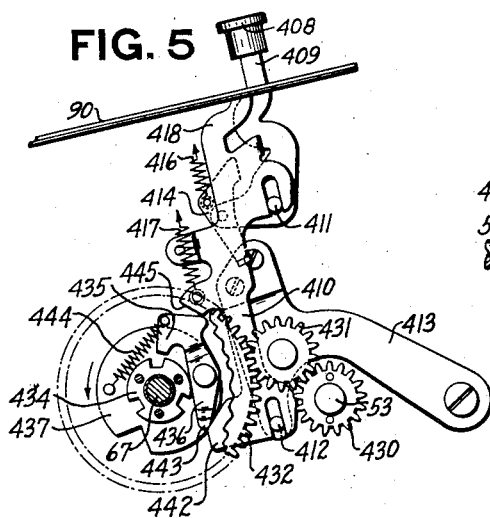
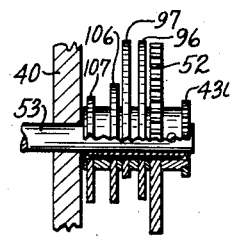
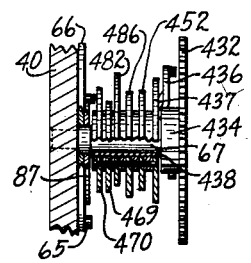
Inventor
Charles L. Lee, Deceased
By Leefe Jane Lee, Executrix
By Earl Beust
Her Attorney Dec. 5, 1939.  C. L. LEE  2,181,975
ACCOUNTING MACHINE
Filed Oct. 14, 1935  11 Sheets-Sheet 4
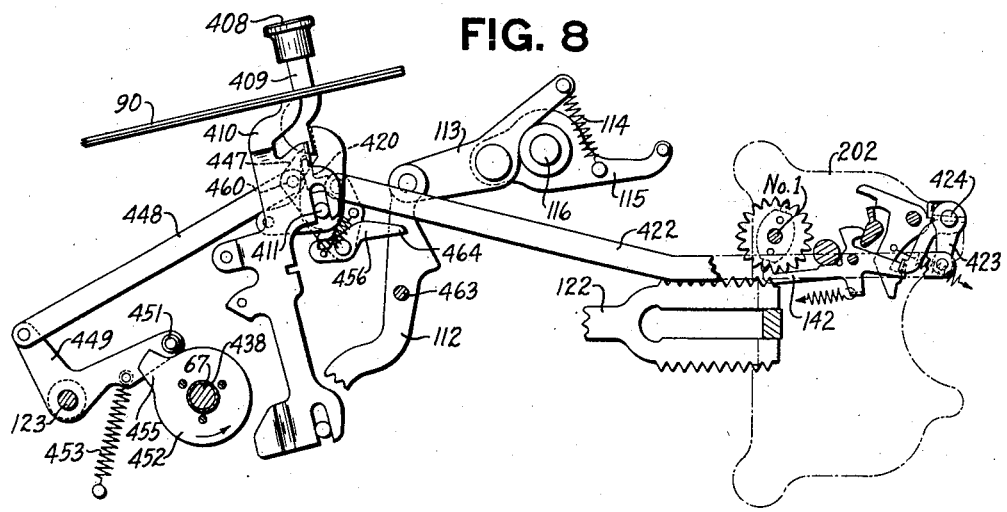
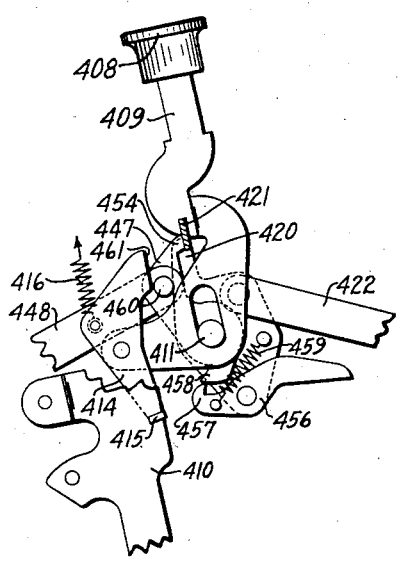
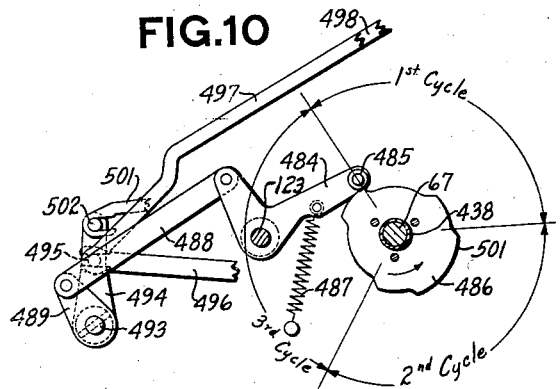
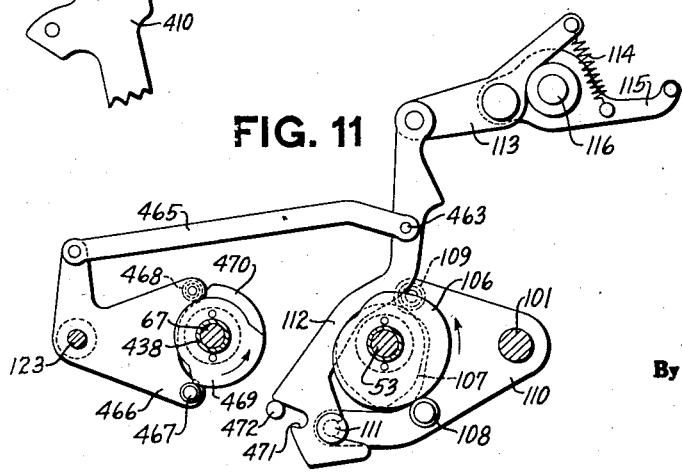
Inventor
Charles L. Lee, Deceased
By Leefe Jane Lee, Executrix
By  Earl Bent
Her Attorney Dec. 5, 1939.   C. L. LEE   2,181,975
ACCOUNTING MACHINE
Filed Oct. 14, 1935   11 Sheets-Sheet 5
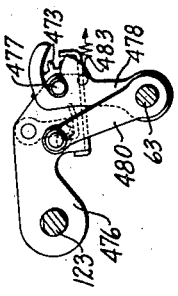
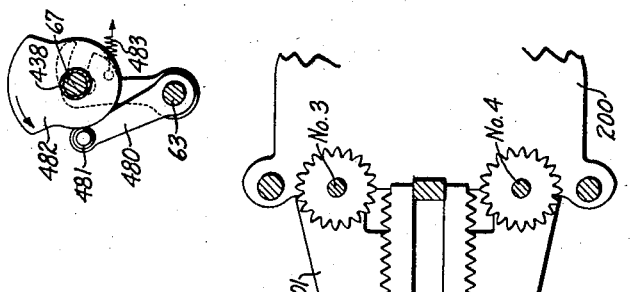
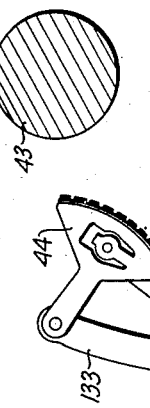
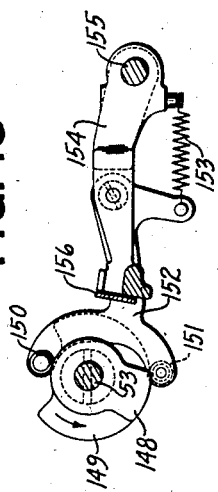
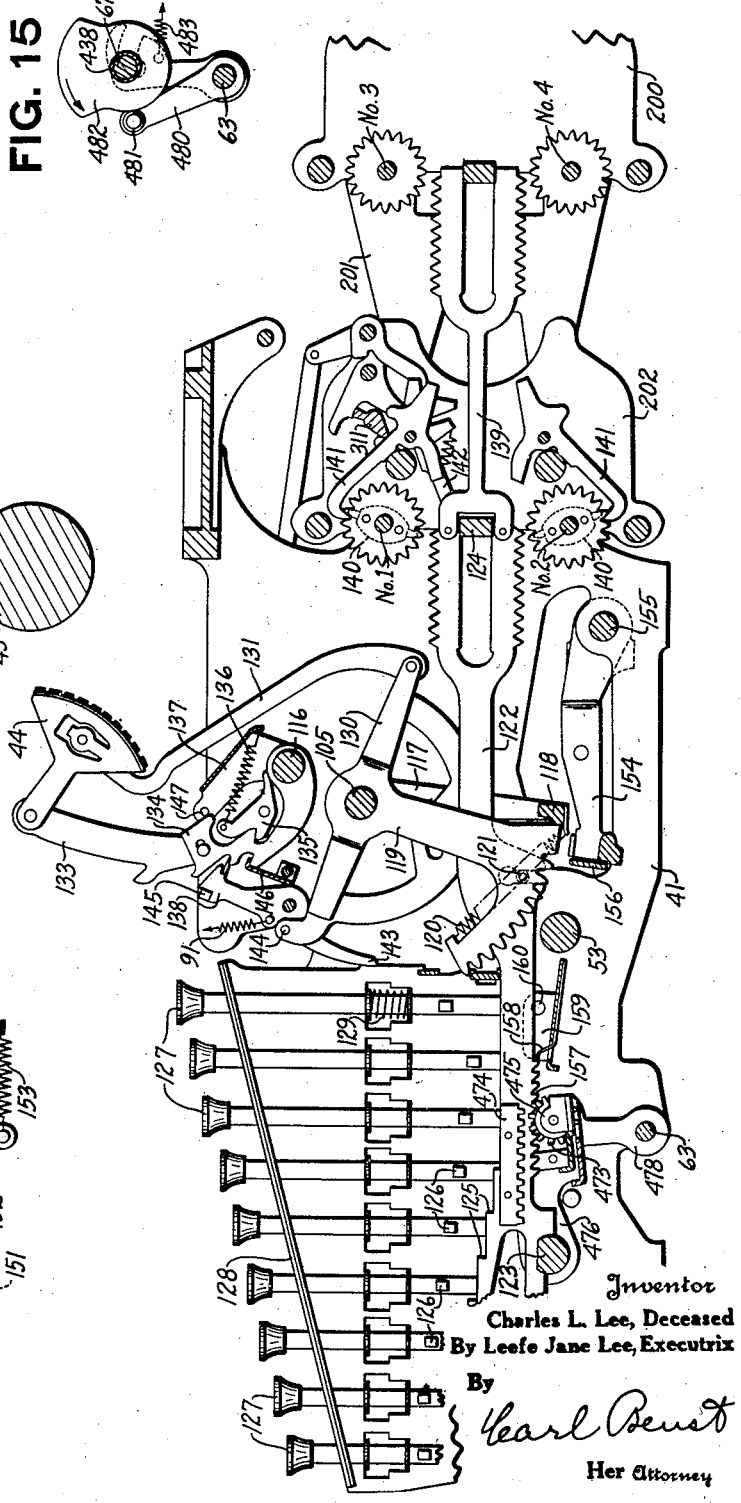
Inventor
Charles L. Lee, Deceased
By Leefe Jane Lee, Executrix
By
Her Attorney Dec. 5, 1939.  C. L. LEE  2,181,975
ACCOUNTING MACHINE
Filed Oct. 14, 1935   11 Sheets-Sheet 6
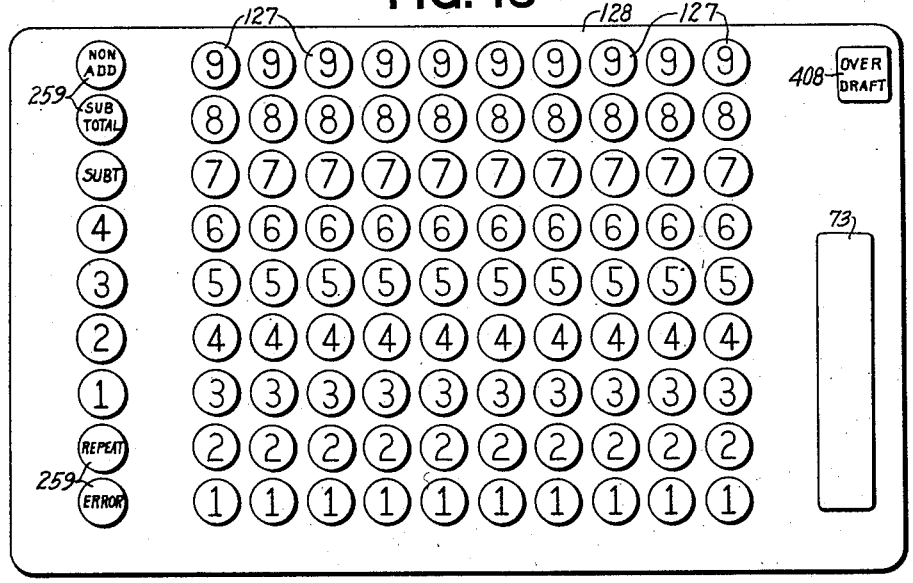
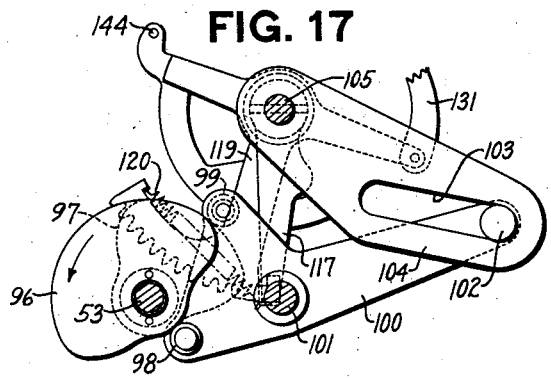
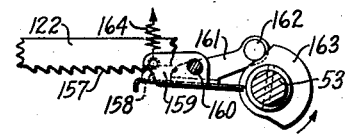
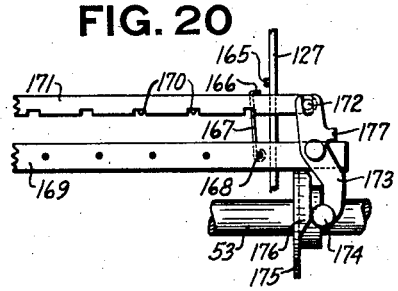
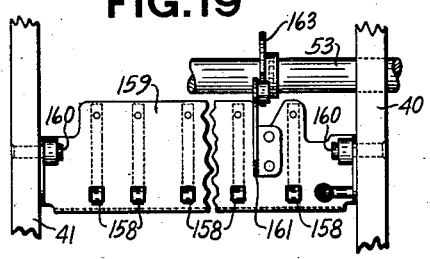
Inventor
Charles L. Lee, Deceased
By Leefe Jane Lee, Executrix
By Earl Benst
Her Attorney Dec. 5, 1939.　　　　C. L. LEE　　　　2,181,975
ACCOUNTING MACHINE
Filed Oct. 14, 1935　　　11 Sheets-Sheet 7

Inventor
Charles L. Lee, Deceased
By Leefe Jane Lee, Executrix
By
Her Attorney

Dec. 5, 1939.  C. L. LEE  2,181,975
ACCOUNTING MACHINE
Filed Oct. 14, 1935   11 Sheets-Sheet 8

Inventor
Charles L. Lee, Deceased
By Leefe Jane Lee, Executrix
By
Her Attorney

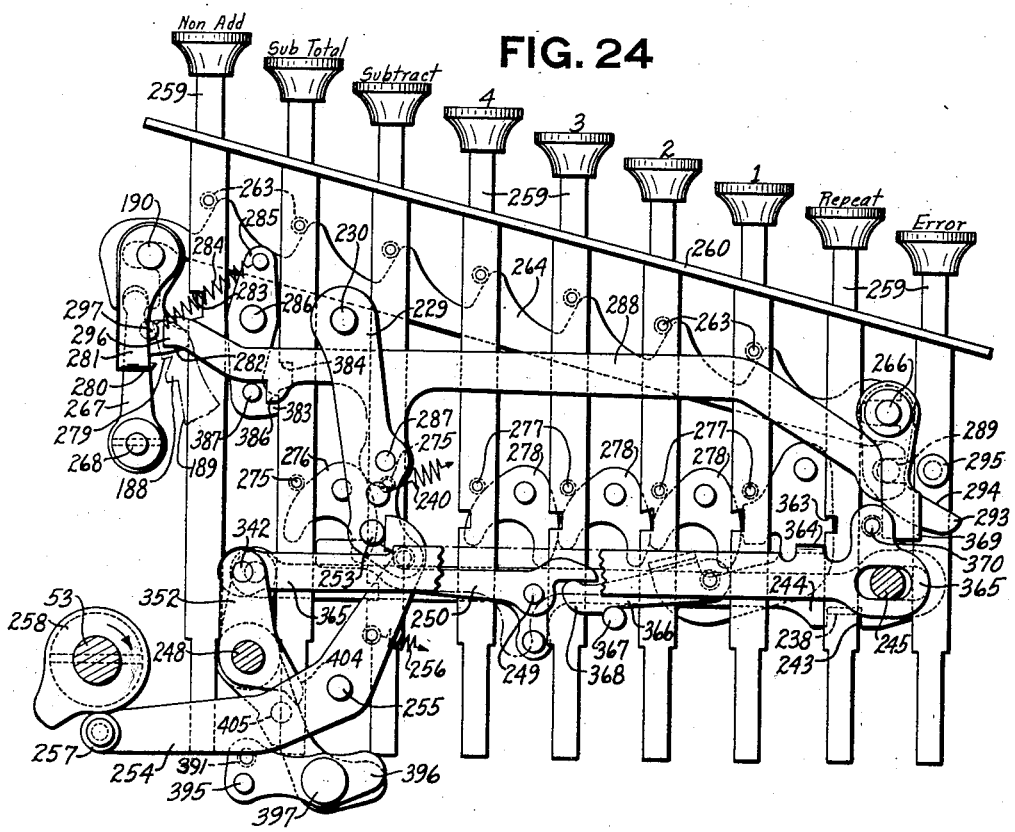

Dec. 5, 1939.    C. L. LEE    2,181,975
ACCOUNTING MACHINE
Filed Oct. 14, 1935    11 Sheets-Sheet 10
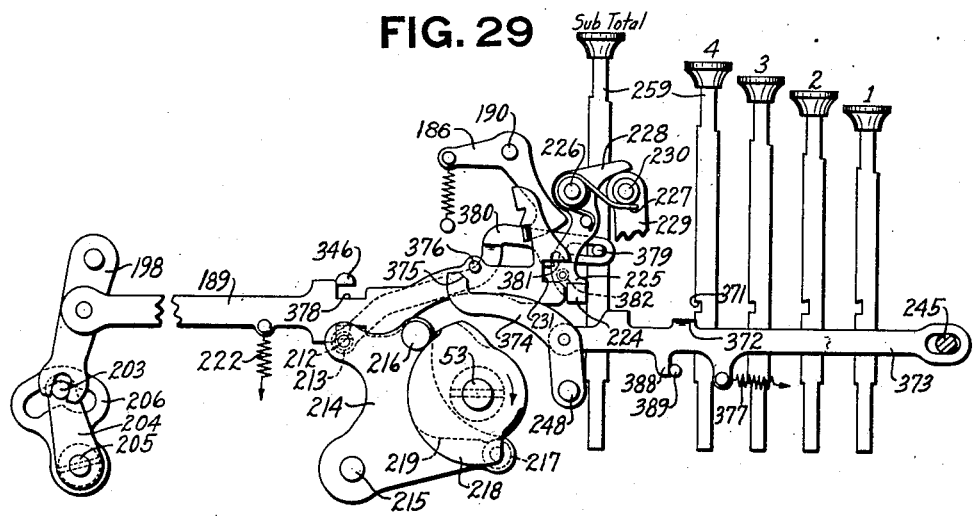
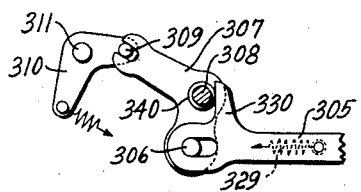
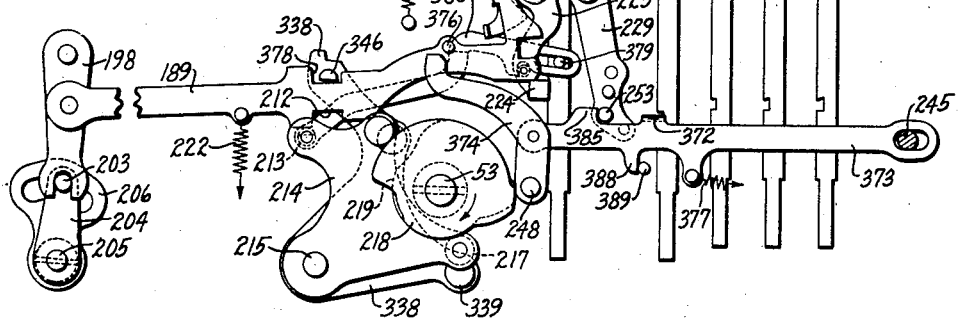
Inventor
Charles L. Lee, Deceased
By Leefe Jane Lee, Executrix
By Carl Benst
Her Attorney Dec. 5, 1939.  C. L. LEE  2,181,975
ACCOUNTING MACHINE
Filed Oct. 14, 1935  11 Sheets-Sheet 11
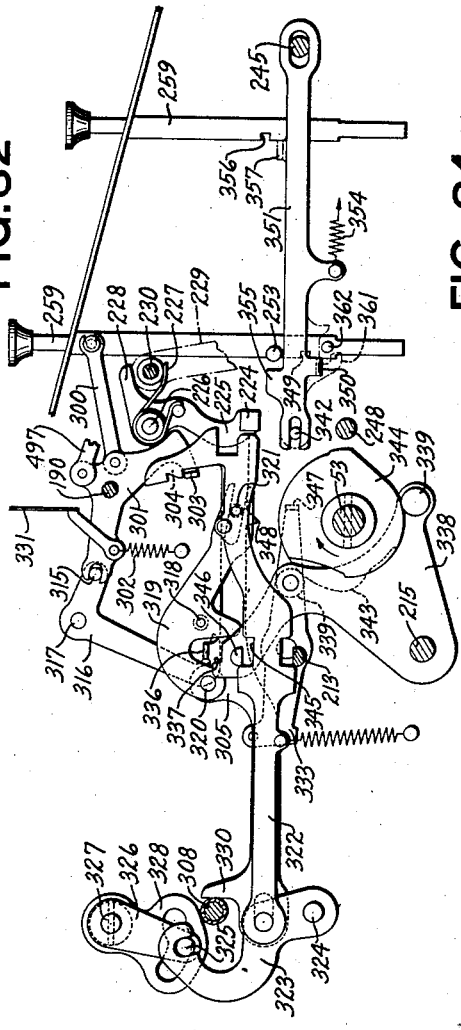
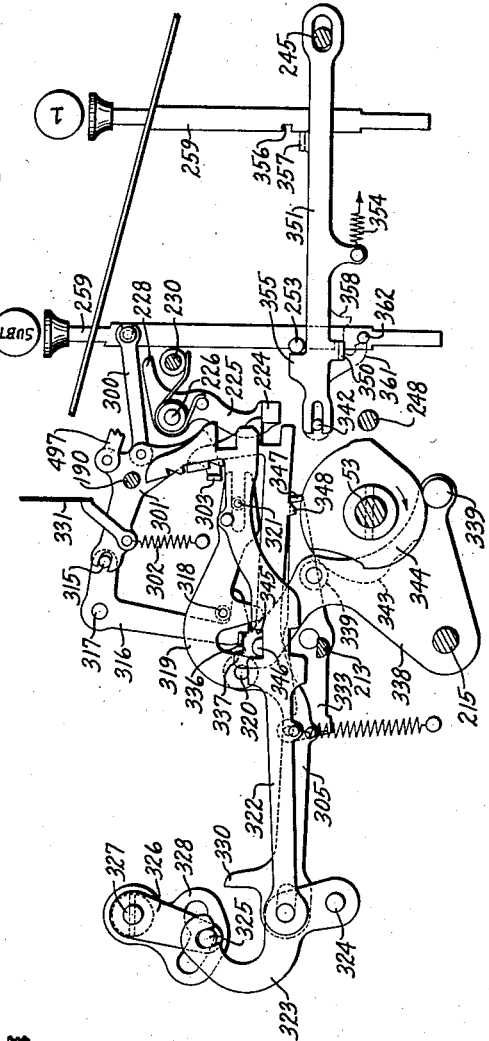
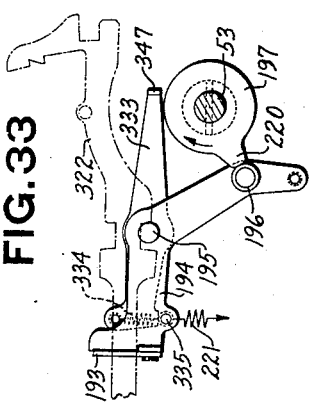
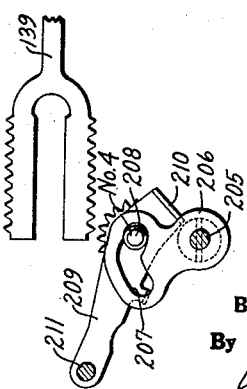
Inventor
Charles L. Lee, Deceased
By Leefe Jane Lee, Executrix
By Earl Beust
Her Attorney Patented Dec. 5, 1939

2,181,975

UNITED STATES PATENT OFFICE 2,181,975

ACCOUNTING MACHINE

Charles L. Lee, deceased, late of Dayton, Ohio, by Leefe Jane Lee, executrix, Dayton, Ohio, assignor to The National Cash Register Company, Dayton, Ohio, a corporation of Maryland Application October 14, 1935, Serial No. 44,838

20 Claims. (Cl. 235—60)

This invention relates to bookkeeping or accounting machines and the like, but more particularly to improvements in the operating and controlling mechanisms of machines of the type illustrated and described in Letters Patent of the United States Nos. 1,197,276 and 1,197,278, issued September 5, 1916, to Halcolm Ellis and U. S. Patent No. 1,819,084, issued August 18, 1931, to Emil John Ens.

Practically all the electrically operated adding and listing machines, commonly referred to as bookkeeping or accounting machines, of today have evolved from a hand-operated machine. Most of the earlier machines were equipped with a hand lever that operated an oscillating drive shaft which in turn actuated the mechanism of the machine. Later these machines were equipped with electric motors which oscillated the drive shaft in substantially the same manner as the hand lever. In this transition, the electric motors were merely added to the hand-operated machines and in most cases no attempt was made to modernize or improve the operating and actuating mechanisms of the machine.

It is a well known engineering fact that from a manufacturing viewpoint a revolving drive shaft has many advantages over an oscillating drive shaft. For example, the greater latitude of movement of the revolving drive shaft, a cycle of operation of which consists of 360 degrees of movement, gives an increased range in the timing of moving parts that permits the manufacture of these parts to exact dimensions and eliminates a large percentage of the hand-adjusting and fitting required in machines with oscillating drive shafts limited to an approximate movement of 60 degrees in each direction.

The various other advantages of the revolving drive shaft over the oscillating drive shaft will be revealed as the specification progresses.

It is, therefore, an object of this invention to provide accounting machines of the type referred to above with a revolving drive shaft.

Another object is to provide novel controlling means for the rotary drive shaft mechanism.

Still another object is to adapt the overdraft device for use with the rotary drive shaft mechanism.

A further object is to supply an improved key releasing means.

A still further object is to provide novel means to select and condition the different totalizers for their various functions.

With these and incidental objects in view the invention includes certain novel features of construction and combination of parts, the essential elements of which are set forth in appended claims and a preferred form or embodiment of which is hereinafter described with reference to the drawings which accompany and form a part of this specification.

Of said drawings:

Fig. 3 is a right side elevation of the machine releasing mechanism.

Fig. 4 is a fragmentary view of the machine clutch.

Fig. 5 is a detail view of the overdraft key and a part of its associated mechanism.

Fig. 6 is a fragmentary view of the righthand end of the rotary drive shaft.

Fig. 7 is a fragmentary view of the overdraft control cam cluster.

Fig. 8 is a right side elevation of the overdraft key locking mechanism.

Fig. 9 is a detail view of a portion of the overdraft key locking mechanism.

Fig. 10 is a detail view of a portion of the overdraft control mechanism.

Fig. 11 is a right side view of the means for controlling the printing mechanism during overdraft operation.

Fig. 12 is a sectional view of the machine taken just to the right of one of the rows of amount keys.

Fig. 13 is a detail view of the alining mechanism for the actuator racks.

Fig. 14 is an end view of the overdraft storage differential.

Fig. 15 is a detail view of the engaging mechanism for the overdraft differential.

Fig. 16 is a top plan view of the keyboard of the machine of the instant invention.

Fig. 17 shows in detail the mechanism for operating the leading frame shaft.

Fig. 18 is a detail of the rack retaining mechanism.

Fig. 19 is a fragmentary view, as observed from beneath the machine, of the rack retaining mechanism.

Fig. 20 illustrates in detail the amount key locking mechanism.

Fig. 24 is a left side elevation of the machine control keys and a portion of their associated mechanism.

Fig. 25 is a detail view, as observed from above the machine, of a portion of the totalizer selecting mechanism.

Fig. 26 is a sectional view of a part of the mechanism shown in Fig. 25.

Fig. 27 is a detail view showing a portion of the key releasing mechanism.

Fig. 28 is a detail view of a portion of the key releasing mechanism.

Fig. 29 is a side elevation as observed from the left of the machine, showing the selecting and engaging mechanism for one of the totalizers.

Fig. 30 is a detail view of a portion of the subtract mechanism.

Fig. 31 illustrates the mechanism of Fig. 29 in moved position.

Fig. 32 is a left side elevation of the mechanism for controlling the balance totalizer in subtract operations.

Fig. 33 is a detail view of a portion of the add-controlling mechanism for the totalizers.

Fig. 34 illustrates the position of the parts shown in Fig. 32 when the subtract key is depressed.

Fig. 35 shows a fragment of one of the denominational actuator racks and its associated totalizer wheel.

Figure 1:
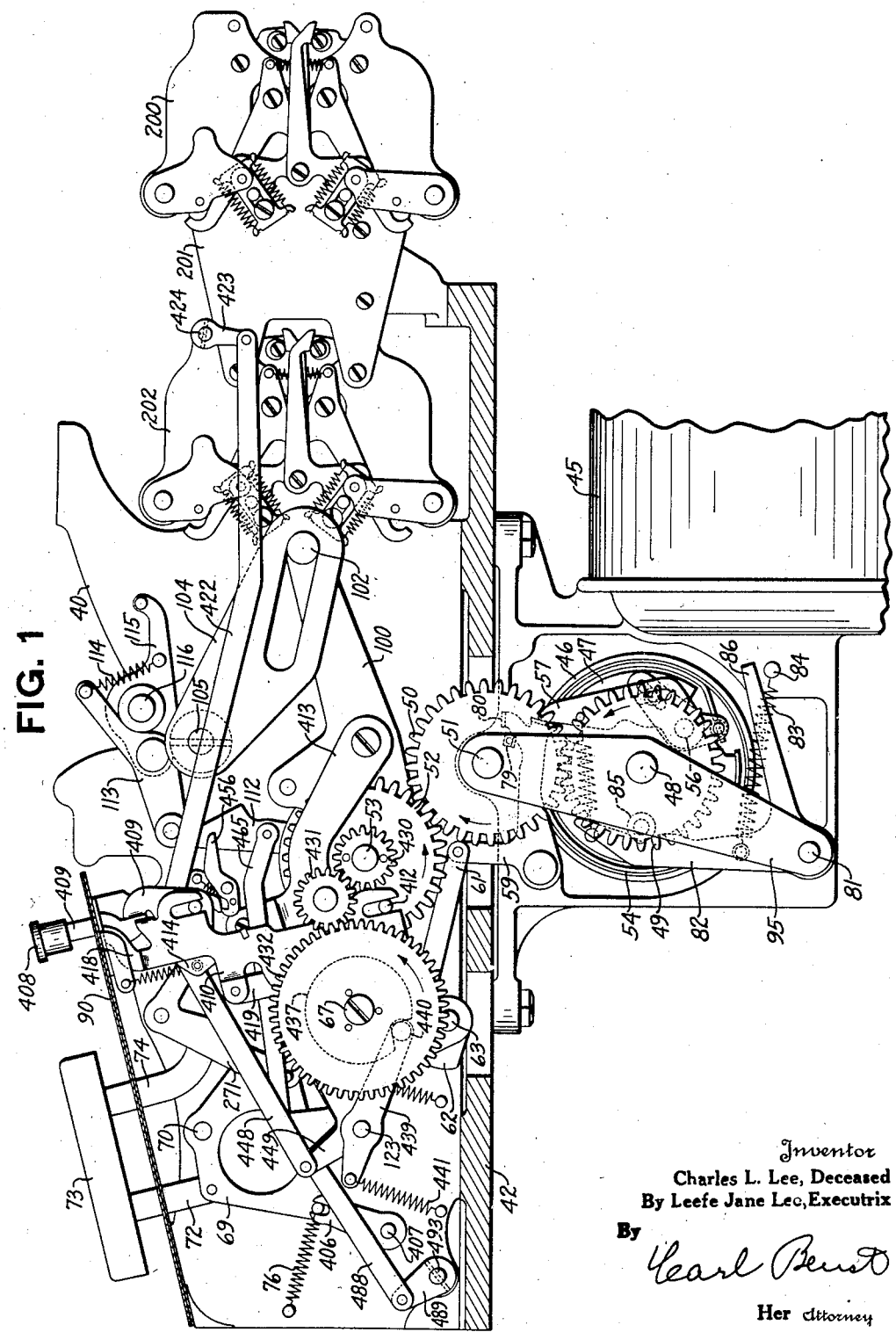
Fig. 1 is a side elevation as observed from the right of the machine showing the operating mechanism.

In the figures showing the framework in dot and dash lines, where the dot and dash lines do not show behind the parts, it indicates that such parts are in front of the frames, but where the dot and dash lines are shown crossing the full-line parts it indicates that such parts are behind the frames.

General Description

The machine of the instant invention is of the well known Ellis type and is equipped with a laterally shiftable traveling carriage supporting a platen roll adapted to present record material to the type carriers. Depending upon the use to which the machine is to be put, it may or may not be equipped with a typewriter keyboard and type for the entering of various data upon the record material. The machine of the present invention is equipped with a rotary drive shaft which replaces the conventional oscillating drive shaft used heretofore in machines of this type. A constantly running motor is operatively connected to the drive shaft by means of a clutch mechanism that is controlled by the usual releasing mechanism. In all operations except overdraft operations, depressing the regular release bar causes the motor to turn the drive shaft one revolution to operate the machine through one cycle of movement. In overdraft operations, depressing the overdraft key causes the drive shaft to make three revolutions to operate the machine through three cycles of movement to transpose the complement of an overdraft into a true negative amount and print this amount on the record material carried by the platen roll.

The instant machine is equipped with four totalizers, one of which is an adding and subtracting or balance totalizer, the others are straight adding totalizers. The totalizers are actuated by a plurality of denominational reciprocating racks which are in turn positioned in adding and subtracting operations under control of a plurality of amount keys arranged in denominational rows on the keyboard. In total and subtotal operations the totalizer wheels position the racks to record the amount on said totalizer wheels. There is a type carrier for each denomination and they are positioned by the actuator racks commensurate with the value of the depressed amount keys or the amount on the totalizer wheels.

The adding and subtracting functions of the instant machine are controlled by the traveling carriage in tabulated positions thereof and the other functions, including non-add, sub-total, total, repeat, and also subtract, are governed by a row of control keys located on the left side of the keyboard. Other features of the instant machine will be disclosed in the detailed description following.

Detailed Description

Framework and operating mechanism

The mechanism of the machine is supported by a right frame 40 (Figs. 1, 2 and 21), and a left frame 41, secured to a machine base 42, which also supports a suitable cabinet or case (not shown) that encloses the mechanism of the machine. Mounted on the machine case is a laterally shiftable traveling carriage similar to that used on typewriters, supporting a platen roll 43 (Fig. 12) which carries record material in proper relation to the type carriers, one of which, an amount segment 44, is here shown. Secured to the base 42 is an electric motor 45 (Figs. 1, 3 and 4) of the constantly running type geared to a clutch driving member 46 adapted to be frictionally connected to a clutch driven member 47, both of said clutch members being rotably supported by a stud 48 secured in the motor frame. Secured to a hub of the clutch driven member 47 is a gear 49 connected by an intermediate gear 50, loose on a stud 51 in the motor frame, to a gear 52 secured on a main drive shaft 53, opposite ends of which are journaled in the frames 40 and 41.

One end of a clutch band 54 (Fig. 3) is secured to the clutch driven member 47 while the other end thereof is connected to a bell crank 55 loose on a stud 56 in the member 47 and adjustably connected to an arm 57 also loose on the stud 56. The upper end of the arm 57 cooperates with a bent-over ear 58 of a lever 59 loose on a stud 60 in the motor frame. An upward extension of the lever 59 is connected by a link 61 to an arm 62 loose on an auxiliary differential engaging shaft 63 journaled in the frames 40 and 41. The arm 62 has a step 64 adapted to cooperate with a stud 65 in one arm of a three-armed lever 66 loose on a stud 67 in the frame 40. An upwardly extending arm of the lever 66 is bifurcated to embrace a stud 68 in a release plate 69 pivoted on a stud 70 in the frame 40. The plate 69 has a stud 71 straddled by the bifurcated lower end of a stem 72 of a starting bar 73 slidably supported by an auxiliary keyboard plate 90. Another stem 74 of the bar 73 is loosely connected by a stud 75 to a rearwardly disposed arm of the lever 66. A spring 76 urges the plate 69 clockwise and the lever 66 counterclockwise to normally maintain the stud 65 in the path of the step 64. Depressing the starting bar 73 rocks the plate 69 counterclockwise and the lever 66 clockwise to move the stud 65 out of the path of the step 64. This allows a torsion spring 77 (Fig. 3) to rock the lever 59 counterclockwise to move the ear 58 out of the path of the upper end of the arm 57. A spring 78 then urges the arm 57 and the crank 55 counterclockwise to expand the band 54, thereby causing it to grip the inner surface of the constantly revolving clutch driving member 46.

In all machine operations except overdraft operations, the clutch driven member 47, the gear 52 and the main drive shaft 53 make one counterclockwise revolution. Near the end of rotation of the shaft 53, a stud 79 in the gear 50 engages an ear 80 of the lever 59 to rock said lever clockwise. Consequent clockwise movement of the arm 62 moves the step 64 beyond the stud 65, allowing the spring 76 to restore the lever 66 to normal position so that the stud 65 retains the plate 62 and lever 59 in untripped position. Return movement of the lever 59 moves the ear 58 in the path of the arm 57 which, upon engagement therewith, disengages the clutch driven member from the clutch driving member.

Loose on a stud 81 (Fig. 1) in the motor frame is a return lever 82 urged clockwise by a spring 83 tensioned between said lever and a stud 84. The upper end of the lever 82 has therein a camming notch, which, in cooperation with a roller 85 carried by the gear 49, completes return movement of the machine operating mechanism to home position after the clutch is disengaged as related above. An extension 86 of the lever 82 in cooperation with the stud 84 limits clockwise movement of said lever when the roller 85 moves out of engagement therewith.

Referring to Fig. 3, a simple and efficient device is provided to prevent repeat operations of the machine in case the starting bar 73 is retained depressed. This mechanism includes a non-repeat latch 87 loose on the shaft 67. Said latch 87 is urged clockwise and normally maintained in contact with a stop stud 88 in the lever 66 by a spring 89. Clockwise releasing movement of the lever 66 moves a hook 93 of the latch 87 into the path of a similar hook 94 on the arm 62. In case the starting bar 73 is retained depressed during the restoration of the arm 62, the hook 93 latches over the hook 94 when the hook 94 is restored by stud 79 engaging ear 80, and prevents a repeat operation of the machine by retaining said arm 62 and the lever 59 in untripped position. As soon as pressure is removed from the bar 73, the lever 66 is restored counterclockwise by the spring 76, which disengages the hook 93 from the hook 94 and causes the stud 65 to re-engage the step 64. A brace plate 95 (Fig. 1) supports the righthand ends of the studs 48, 51 and 81.

Figure 2:
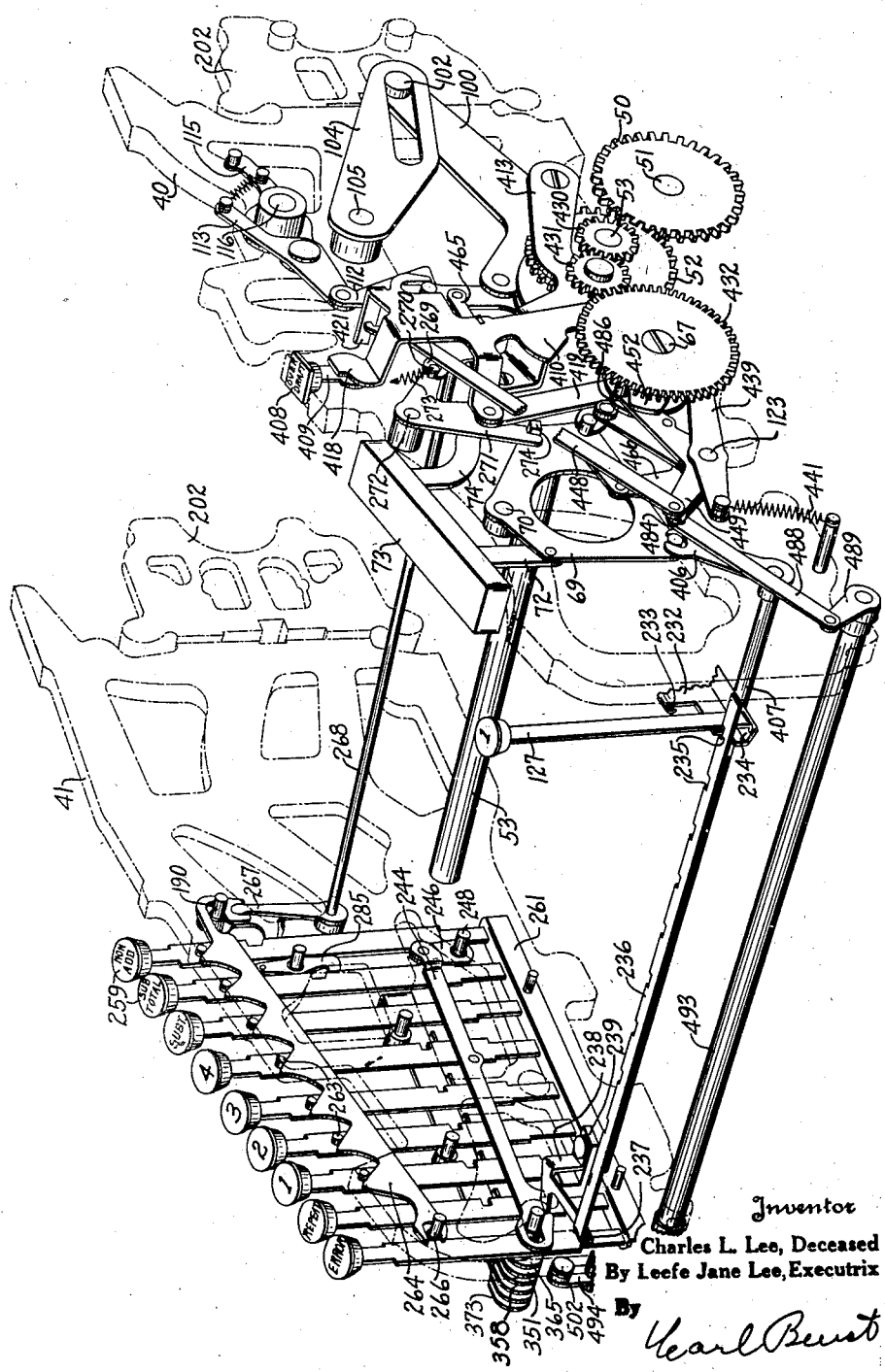
Fig. 2 is a perspective view of the two side frames of the machine and a portion of the mechanism connected thereto.

Referring to Figs. 2 and 17, secured on the main drive shaft 53 are companion cams 96 and 97, the peripheries of which are adapted to cooperate with rollers 98 and 99 carried by a Y-shaped lever 100 loose on a stud 101 in the frame 40. The lever 100 has a stud 102 which extends through a slot 103 in an arm 104 secured to a leading frame shaft 105 journaled in the frames 40 and 41. During each machine operation, the cams 96 and 97, by means of the lever 100, oscillate the arm 104 and the shaft 105 first counterclockwise and then back to normal position through an approximate angle of 40 degrees.

Shown in Fig. 11 is the means for operating the printer mechanism. Secured on the main drive shaft 53 are companion cams 106 and 107 cooperating respectively with rollers 108 and 109 carried by a cam arm 110 loose on the stud 101. The arm 110 has a stud 111 adapted to cooperate with a notch in a link 112 the upper end of which is connected to an arm 113 resiliently connected by a spring 114 to an arm 115 secured on a printer shaft 116 journaled in the frame 40 and in the printer frame (not shown). The notch in the link 112 is constantly engaged with the stud 111 except in overdraft operations, and the manner in which said link 112 functions in overdraft operations will be described later herein. Counterclockwise revolution of the shaft 53 by means of the cams 106 and 107, the arm 110, link 112 and arms 113 and 115 oscillate the printer shaft 116 first clockwise and then back to normal position to cause the printing mechanism to function.

*Totalizer and printer actuating mechanism*

Fig. 12 illustrates the totalizer and printer actuating mechanism for one denominational unit of the machine. As this mechanism is substantially duplicated in each denominational unit it is felt that the description of the one unit here shown will be sufficient for the purpose of this specification.

An actuator leading frame 117 is formed by means of two depending arms secured at opposite ends of the shaft 105 connected by a cross-bar or bail 118. Loose on the shaft 105 is a printer reducing segment 119, a downward extension of which is maintained in contact with the leading frame bail 118 by a spring 120 stretched between said reducing arm and said bail. The segment 119 carries a stud 121 embraced by a vertical slot in an actuator rack 122 mounted for horizontal reciprocating movement by means of a grooved rod 123 and a bar 124 cooperating with the rearwardly disposed bifurcated end of said rack 122. The rod 123 and the bar 124 are supported by the frames 40 and 41. The rack 122 has a series of graduated steps 125 which cooperate with corresponding square studs 126 secured in the stems of amount keys 127. The upper ends of the amount keys 127 extend through apertures in a keyboard plate 128. Each key 127 has a spring 129 tensioned to urge said keys upwardly. When no amount key is depressed, the rack 122 is retained in zero position by means of a zero stop pawl (not shown).

An arm 130 of the segment 119 is connected by a link 131 to the printer segment 44 which is pivotally connected to an arm 133 rotatably supported by the shaft 116. Loosely connected to the arm 133 is an anti-rebound plate 134 which cooperates with an anti-rebound pawl 135 connected by a spring 136 to a printer yoke 137 loose on the shaft 116. The plate 134 has a plurality of projections, one of which cooperates with a zero elimination pawl 138 pivoted on a rod supported by the printer frame and having an arcuate tail 143 that cooperates with a stud 144 in a forwardly extending arm of the segment 130. Each pawl 138 has a bent-over lug 145 which overlies its higher order neighbor. Another projection of the plate 134 is engaged by a printer release trigger 146 rotatably supported in the printer frame.

Depressing one of the amount keys 127 releases the zero stop pawl for its related rack 122 and moves the stud 126 of the depressed key into the path of the corresponding step 125 on said rack 122. Initial movement counterclockwise of the shaft 105 and the leading frame 117 by means of the spring 120 moves the segment 119 and the rack 122 in unison therewith. Rearward movement of the rack 122 is halted when the step 125 engages the stud 126 of the depressed amount keys. However, the leading frame 117 completes its cycle of movement, stretching the spring 120. This positions the actuator rack commensurate with the value of the depressed key, and the segment 119, by means of the link 131, positions the type carrier 44 accordingly. When the segment 119 moves away from zero position, the stud 144, in cooperation with the arcuate tail 143, rocks the zero elimination pawl 138 counterclockwise against the tension of a spring 91 to allow printing movement of the plate 134, arm 133 and type carrier 44. The pawl 138 by means of the overlying ear 145 disengages all the lower order zero elimination pawls from their corresponding plates 134 so that the zeros will print in the lower denomination. When the leading frame 117 reaches the terminus of its initial movement counterclockwise, the printer release trigger 146 is rocked counterclockwise by mechanism (not shown) to release the plate 134 and the arm 133 to the action of the spring 136, which has been further tensioned by clockwise movement of the yoke 137. This causes the type carriers 44 to engage the conventional inking ribbon and carry it into contact with the record material wound around the platen roll 43 to record the value of the depressed key.

After an impression is completed, return movement clockwise of the leading frame 117 returns the segment 119, the rack 122 and the type carrier 44 to zero position, and return movement counterclockwise of the yoke 137, by means of a rod 147 supported thereby, restores the plate 134 and the arm 133 to normal position as shown in Fig. 12.

Secured on the shaft 53 (Fig. 13) are companion cams 148 and 149 cooperating respectively with rollers 150 and 151 carried by a cam arm 152 flexibly connected by a spring 153 to the left arm of a two-armed aliner frame 154, both of said arms of said two-armed aliner frame 154 being secured to a shaft 155 journaled in the frames 40 and 41. After the rack 122, the segment 119, and the type carrier 44 have been positioned in the manner explained above, the cams 148 and 149 rock the frame 154 clockwise to cause an alining bar 156 carried thereby to engage the proper tooth space in the segment 119 to position said segment and the type carrier 44 during impression. Immediately after the impression, the aliner bar 156 is rocked out of engagement with the segment 119.

Totalizers

The machine of this invention is equipped with four totalizers (Fig. 12) numbered from 1 to 4, in the customary manner. The upper front or #1 totalizer is an adding and subtracting or balance totalizer, and the other three totalizers are adding totalizers.

In adding operations, after the rack 122 has been positioned as explained above, the corresponding wheel of the selected totalizer is rocked into engagement with one of the two sets of teeth carried by said rack, or one of two sets of teeth carried by an extension 139 of the rack 122. Return movement forwardly of the rack 122 rotates the wheel of the engaged totalizer commensurate with the value of the depressed amount key to add this amount therein.

In subtracting operations, the corresponding wheel of the No. 1 or balance totalizer is rocked into engagement with the rack 122 prior to its initial movement rearwardly, which movement rotates said wheel reversely to subtract the value of the depressed amount key therefrom. Each of the totalizer wheels carries a transfer cam 140 which, when a totalizer wheel passes through zero, engages and trips an add pawl 141 for the next higher denomination, thereby causing one to be added in said denomination. Likewise in subtract operations, when a wheel of the No. 1 totalizer is rotated reversely to zero, the transfer cam 140 therefor engages and trips a subtract transfer pawl 142 to cause one to be subtracted from the next higher denomination.

In total and sub-total recording operations, the corresponding wheel of the selected totalizer is engaged with the rack 122 prior to its initial movement rearwardly, which movement rotates said wheel in a reverse direction until said wheel is stopped in zero position by one of the teeth of the transfer cam 140 engaging the inner surface of its add transfer pawl 141. This positions the rack 122 and the type carrier 44 commensurate with the amount of the totalizer wheel. The difference between a read and reset or a sub-total and total recording operation is that in read or sub-total operations the wheel of the selected totalizer remains in engagement with the rack 122 during its return movement forwardly and is therefore returned to its former position, and in reset or total operations the wheel of the selected totalizer is disengaged from the rack 122 before said rack starts its return movement forwardly, thereby leaving said wheel standing at zero.

Rack retaining mechanism

Mechanism is provided to take the strain off of the actuator racks in various total recording operations due to the excessive tensioning of the springs 120 (Fig. 12) when said racks are stopped in one of their earlier positions by means of the transfer cams 140 in cooperation with the transfer pawls 141 when there is a small amount on the totalizer. This mechanism likewise insures that the racks are returned fully to zero at the end of machine operation.

At the beginning of each machine operation, the rack retaining mechanism is moved to ineffective position. After the leading frame 117 has completed its initial movement counterclockwise and the rack 122 has been positioned as explained above, the rack retaining mechanism is moved to effective position to relieve the excessive strain on the rack and totalizer transfer mechanism during return movement of the leading frame 117. This mechanism will now be described in detail.

Referring to Figs. 12, 18 and 19, each of the racks 122 has on the lower edge thereof a series of ratchet teeth 157 adapted to cooperate with spring pawls 158 secured on a retaining pawl plate 159 rotatably supported by trunnions 160 in the frames 40 and 41. Secured to the plate 159 is a cam arm 161 with a roller 162 that is maintained in contact with the periphery of a plate cam 163, secured on the main shaft 53, by a spring 164 which is tensioned to urge the plate 159 in a clockwise direction.

At the beginning of a machine operation, the cam 163 rocks the plate 159 counterclockwise to disengage the pawls 158 from the ratchet teeth 157. After the leading frame 117 has completed its initial movement counterclockwise and the racks 122 have been positioned by means of the transfer cams 140 in cooperation with the transfer pawls 141 as explained earlier herein for various total recording operations, the cam 163 returns the plate 159 clockwise to reengage the pawls 158 with the teeth 157. The plate 159 remains in this position throughout the remainder of machine operation, return movement of the racks 122 causing the teeth 157 to ratchet over the pawls 158. This mechanism relieves the transfer mechanism of the strain caused by the springs 128 when the actuator racks 122 are stopped early in their initial movement rearwardly. This mechanism also insures that the racks are returned fully to zero position at the end of machine operation.

Amount key locking mechanism

Mechanism is provided to lock the amount keys against movement during machine operation. This mechanism is shown in Fig. 20 and includes the following mechanism:

Each amount key 127 carries a stud 165 adapted to cooperate with a right-angled upper edge 166 of a plate 167 loose on a rod 168 supported by bars 169, only one here shown, supported by the keyboard frame. The plate 167 has an extension which cooperates with a notch 170 in a bar 171 slidably supported in the keyboard frame. The bar 171 carries a stud 172 embraced by the bifurcated upper end of a lever 173 pivoted to the bar 169 and carrying a roller 174 which cooperates with a cam disk 175 secured on the shaft 53. The plate 167 and connected mechanism is urged clockwise by a torsion spring (not shown) to normally maintain the roller 174 in contact with the face of the cam 175. A node 176 of the cam 175 maintains the plate 167 in ineffective position when the machine is at rest. At the beginning of machine operation, the node 176 moves out of the path of the roller 175, allowing the plate 167 to move clockwise so that the edge 166 moves in the path of the stud 165.

In case the amount key 127 has not been depressed, the extension 166 moves below the stud 165, blocking downward movement of said amount key. In case the key 127 has been depressed, the extension 166 moves over the stud 165, preventing upward or releasing movement of said amount key. Near the end of machine operation, the node 176 rocks the arm 173 and the plate 167 counterclockwise to ineffective position. A bent-over ear 177 of the lever 173 in cooperation with the top edge of the bar 169 limits the clockwise movement of said lever 173.

Totalizer selecting and controlling mechanism

The adding functions of the different totalizers are controlled by means of control elements located in columnar positions on the traveling carriage in cooperation with hanging bar levers. The subtract function of the No. 1 or balance totalizer is controlled either by control elements on the traveling carriage or by means of a Subtract" control key. A "Non-add" control key is provided to prevent addition in any of the totalizers when it is desired to record an amount or item without having said aount or item entered in a totalizer. The various total recording functions of the instant machine are controlled by means of "Total" and "Sub-total" control keys. Adding and subtracting operations may be repeated by means of a "Repeat" control key and an "Error" key is provided to release depressed amount and control keys.

Inasmuch as the totalizer selecting and controlling mechanism is substantially duplicated for each totalizer, it is felt that the explanation of this mechanism in connection with one totalizer will be sufficient. Due to the manner in which the mechanism is illustrated the functioning of the controlling mechanism in adding and various total recording operations will be explained in connection with the lower rear or No. 4 totalizer and in subtracting operations the controlling mechanism will necessarily be explained in connection with the No. 1 or balance totalizer.

Add selecting and controlling mechanism

Figure 21:
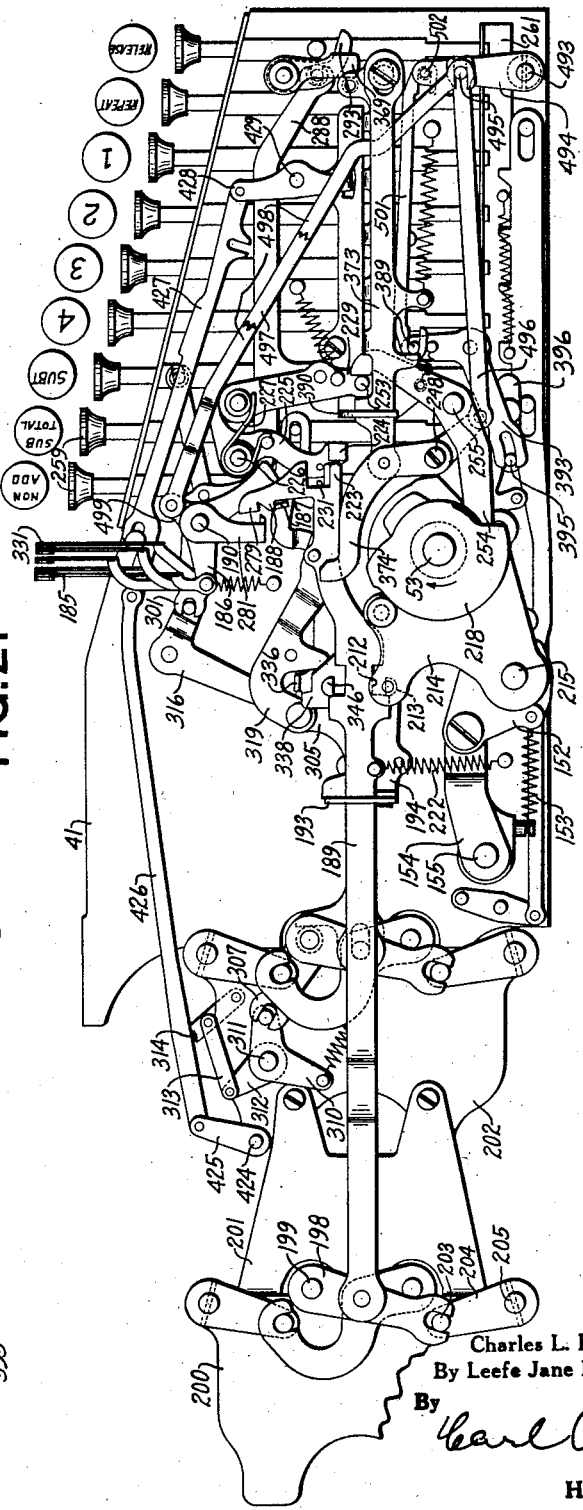
Fig. 21 is a left side elevation of the machine, showing in particular the totalizer controlling and engaging mechanisms.
Figure 23:
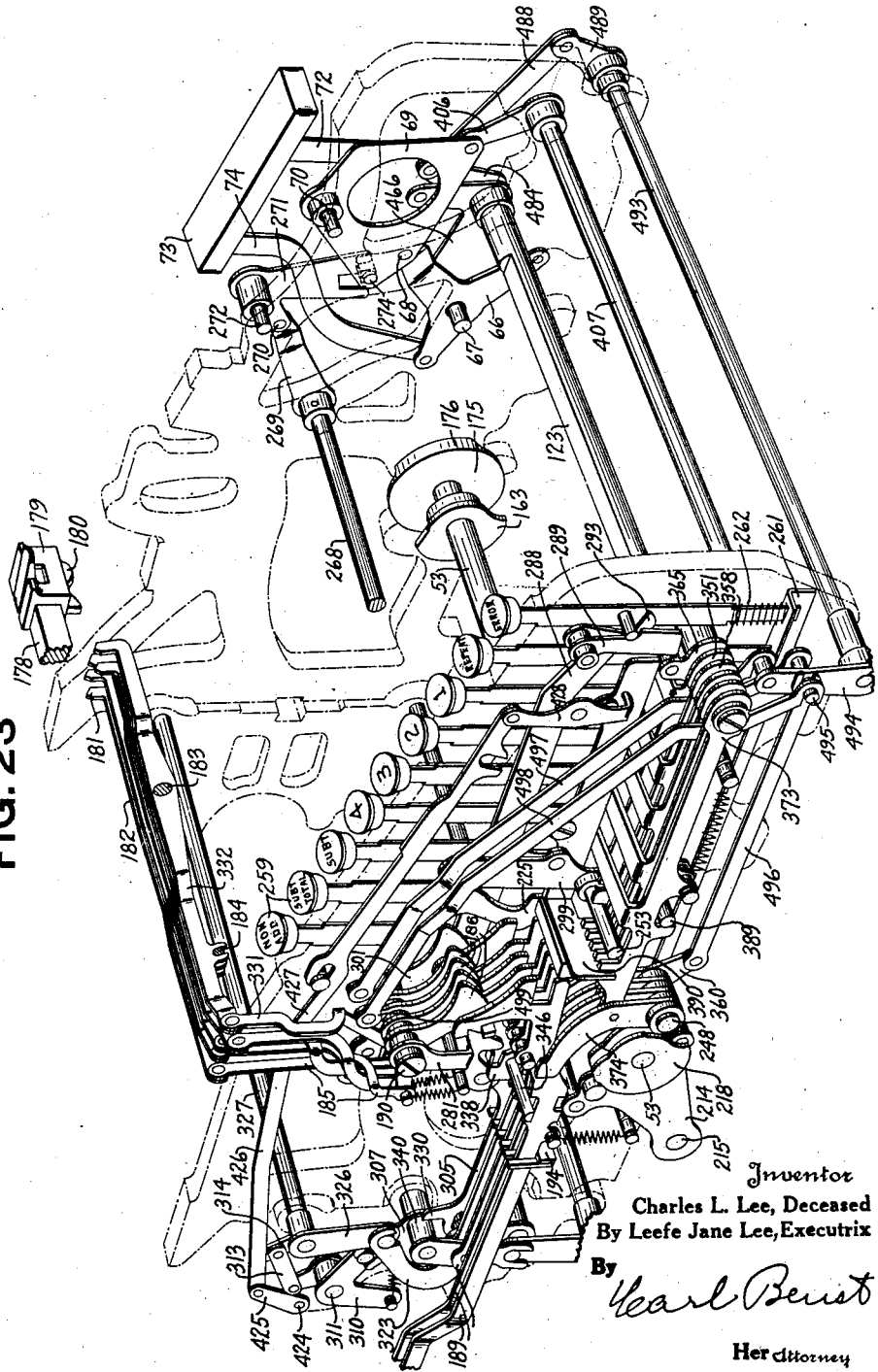
Fig. 23 is a perspective view showing the totalizer controlling mechanism and the machine releasing mechanism.

Directing attention to Figs. 21 and 23, secured to the traveling carriage is a bar 178, upon which is adjustably mounted in proper relation to a particular column of the record material one of several control elements 179. The element 179 has a lug 180, adapted to cooperate with an upturned extension 181 of a No. 4 hanging bar lever 182 loose on a stud 183 secured in a machine frame (not shown). The stud 183 also supports the add hanging bar lever for the other three totalizers, as well as the subtract hanging bar lever for the balance totalizer. The hanging bar levers have depending slotted projections adapted to cooperate with annular grooves in a stud 184 secured in the tabulating frame. These annular grooves in the stud 184 maintain the hanging bar levers in proper alinement.

The lever 182 is connected by a link 185 to an add-control arm 186 loose on a stud 190 in the left frame 41. A bent-over ear 187 of the arm 186 cooperates with a tooth 188 on an upward extension of a totalizer engaging pitman 189 the forward end of which is supported in a slotted comb 193 secured to a lever 194 (see also Fig. 33) loose on a stud 195 in the frame 41. The lever 194 carries a roller 196 adapted to cooperate with the periphery of a cam 197 secured to the main shaft 53. The rearward end of the pitman 189 is connected with an arm 198 loose on a stud 199 secured in a rear totalizer frame 200. The frame 200 is connected by two plates 201 to a front totalizer frame 202. The lower end of the arm 198 is bifurcated to embrace a stud 203 in an arm 204 secured on a totalizer engaging shaft 205 journaled in the totalizer frame 200. Secured on opposite ends of the shaft 205 are totalizer engaging cams 206 (Fig. 35) having therein slots 207 cooperating with rollers 208 on opposite ends of the No. 4 totalizer shaft. The No. 4 totalizer shaft is supported by a rockable totalizer frame composed of right and left hand end plates 209 (only the left end plate here shown) and various other auxiliary plates connected by a bail 210. The end plates 209 are pivoted on trunnions 211, secured in the totalizer frame 200.

Referring to Figs. 21, 29 and 31, the pitman 189 has therein a notch 212 adapted to cooperate with a flattened stud 213 in an add control plate 214 loose on a stud 215 in the frame 41. The plate 214 carries rollers 216 and 217 cooperating respectively with companion cams 218 and 219 secured on the main shaft 53. In adding operations, the shaft 53 makes one clockwise revolution to oscillate the plate 214 first clockwise and then back to normal position. When the traveling carriage is tabulated to a particular column (see also Fig. 23), the projection 180 of the control element 179 engages the extension 181 of the lever 182 to rock said lever clockwise to lift the link 185 to rock the latch 186 clockwise to disengage the ear 187 from the tooth 188 of the pitman 189. The machine is then released for operation by depressing the starting bar 73. Initial movement of the shaft 53 (Fig. 33) moves the node 220 out of the path of the roller 196, allowing the spring 221 to rock the lever 194 counterclockwise. A spring 222 (Fig. 21) causes the pitman 189 to move in unison with the lever 194 to engage the notch 212 in said pitman with the stud 213 in the plate 214. It is obvious that when a totalizer is not selected for addition, the latch 186 prevents the pitman 189 from moving in unison with the lever 194, which makes identical excursions each machine operation.

After the racks 122 have completed their initial movement rearwardly to be positioned under control of the amount keys as explained above, the cams 218 and 219 (Fig. 21) rock the plate 214 clockwise to shift the pitman 189 forwardly, which, by means of the arm 198, rocks the shaft 205 and the cams 206 (Fig. 35) clockwise, which, by means of the slots 207, engages the wheels of the No. 4 totalizer with the extensions 139 of the racks 122. Return movement forwardly of the racks 122 rotates the #4 totalizer wheels commensurate with the value of the depressed amount keys. After said racks have completed their return movement forwardly, the plate 214 is returned counterclockwise to disengage the totalizer wheels from the actuator racks. The lever 194 then returns the pitman 189 upwardly to its normal position. The sequence of movements of the stud 213 given above is known as "adding timing".

When the pitman 189 (Figs. 21 and 29) is in normal ineffective position, a projection thereof is opposite a square stud 224 in an arm 225 loose on a stud 226 in the frame 41. A torsion spring 227 urges the arm 225 clockwise to normally maintain an extension 228 thereof in contact with the rounded end of an arm 229 loose on a stud 230 in the frame 41. The stud 224 thus blocks forward movement of the pitman 189 in case the stud 213 in the plate 214 nibbles on the edge of the notch 212. When the pitman 189 is lowered as explained above, a notch 231 therein is opposite the stud 224. Consequently forward movement of said pitman causes said notch to straddle said stud to prevent accidental disengagement of the pitman 189 from the stud 213 during machine operation. For a purpose later to be explained, the arm 225 receives movement in sub-total operations, but in all other operations this arm remains stationary.

Release of amount keys in adding operations

In equipping the machine of the instant invention with a rotary drive shaft it was necessary to redesign the amount key releasing mechanism. This mechanism is shown in Figs. 2, 24 and 25, and will now be described.

Each row of amount keys has a detent 232 loose on a rod 233 supported by the keyboard frame, and urged counterclockwise by a spring (not shown). The lower edge of the detent 232 has an angular lip 234 which latches over a bent-over portion of the lower end of the amount keys 127 to retain said keys depressed. The detent 232 has a projection extending within one of a series of notches 235 in a bar 236 mounted for horizontal sliding movement in the keyboard frame. A bent-over ear 237 of the bar 236 coacts with an extension of a lever 238 pivoted on a bracket 239 secured to the frame 41. A lefthand extension 241 of the lever 238 extends withon a notch 243 in a release bar 244, the forward end of which is slotted to embrace a stud 245 in the frame 41. The rearward end of the bar 244 is connected to an arm 246 (Fig. 27) fixedly connected to an arm 247 by a hub which is rotatably supported by a stud 248 in the frame 41.

Pivoted on a stud 249 in the bar 244 is a latch 250 (Figs. 24 and 28) urged clockwise by a torsion spring 251 into communication with a stud 252 in the lever 229. Normally the latch 250 is hooked under the stud 252 and is only disengaged therefrom in repeat operations for a purpose presently to be described. The lever 229 carries a stud 253 urged by a spring 240 into cooperation with the upward extension of a lever 254 loose on a stud 255 in the frame 41. A spring 256 urges the lever 254 clockwise to normally maintain a roller 257 carried thereby in contact with the periphery of a key release cam 258 secured on the shaft 53.

Near the end of machine operations the cam 258 rocks the lever 254 counterclockwise to rock the lever 229 clockwise which movement, by means of the latch 250, shifts the bar 244 rearwardly to rock the lever 238 clockwise as viewed in Fig. 2. This shifts the bar 236 toward the left to rock the detent 232 clockwise to disengage the lip 234 thereof from the bent-over end of the amount key stem, after which the amount keys are spring-returned upwardly to normal position.

Control keys and their functions

The functions of the instant machine, with the exception of adding and subtracting, are controlled by means of a row of control keys 259 situated at the extreme left of the keyboard (Figs. 2, 16, 23 and 24). The undercut upper end of the stems of the control keys protrude through apertures in an auxiliary keyboard plate 260 secured to the frame 41. The lower ends of the control keys extend through openings in an angle bar 261 secured to the frame 41. Springs 262 urge the control keys upwardly to normally maintain shoulders thereof in contact with the lower edge of the plate 260. The control keys include an "Error" key (Fig. 24) for manually releasing any depressed amount key or control key, a "Repeat" key that prevents the automatic release of the amount keys at the end of machine operation, keys numbered 1, 2, 3 and 4, which control respectively the total recording functions in the totalizers bearing corresponding numbers, a "Subtract" key which selects and conditions the balance totalizer for a subtract operation, a "Subtotal" key, which, when used in conjunction with the keys 1, 2, 3 and 4, causes the corresponding totalizer to be operated in a sub-total operation, a "Non-add" key, depression of which disables all totalizers for addition and which naturally supersedes the add selecting mechanism.

Each of the control keys 259, with the exception of the "Repeat" key and the "Error" key, carries a stud 263 adapted to cooperate with symmetrical camming projections on a plate 264 slidably mounted by means of slots in said plate in cooperation with studs 190 and 266 in the frame 41. The rearward end of the plate 264 has a downward extension bifurcated to embrace the rounded upper end of an arm 267 secured on a shaft 268 journaled in the frames 40 and 41. Secured on the righthand end of the shaft 268 (Figs. 2 and 23) is an arm 269 slotted to embrace a stud 270 in a lock plate 271 loose on a stud 272 in the frame 40. The plate 271 is urged counterclockwise as viewed in Fig. 2, by a spring 273 to normally place a step thereof in the path of a stud 274 in the release plate 69 to block counterclockwise releasing movement thereof.

Depressing any of the control keys 259 (Fig. 24) carrying one of the studs 263, by means of said stud, shifts the bar 264 forwardly to rock the arm 267, the shaft 268 and arm 269 clockwise as viewed in Figs. 23 and 24. This rocks the latch plate 271 counterclockwise as viewed in Fig. 23 and clockwise as viewed in Fig. 2 to move the step thereon out of the path of the stud 274 to permit releasing movement of the plate 69 when the starting bar 73 is depressed.

Releasing of the machine is likewise controlled by the traveling carriage in tabulated positions thereof by means of a projection on the control element 179 (Fig. 23) in cooperation with a release control hanging bar lever (not shown) but similar to the levers 182. The release control hanging bar lever is operatively connected to the shaft 268, and when said hanging bar lever is engaged by the control element 179, the locking plate 271 is moved to ineffective position, thus permitting release of the machine.

Studs 275 (Fig. 24) in the "Sub-total" key and the "Subtract" key, in cooperation with the locking plate 276, form an interlock between these keys, preventing the depression of more than one key at a time. Studs 277 in the Nos. 1, 2, 3 and 4 "Total" keys, in cooperation with three locking plates 278, prevent the depression of more than one of these keys at a time.

*Non-add mechanism*

Each of the totalizer engaging pitmans 189 (Figs. 21 and 24) has a tooth 279 adapted to cooperate with the angular edge 280 of the bail of a yoke 281 the arms of which are loosely supported by the stud 190. The right arm of the yoke 281 has a nose 282 adapted to cooperate with a notch 283 in the "Non-add" key 259. A spring 284 tensioned between the yoke 281 and a sub-total pawl 285 loose on a stud 286 in the frame 41, urges said yoke counterclockwise to cause the nose to enter the notch when the "Non-add" key is depressed. Counterclockwise movement of the yoke 281 causes the edge 280 to move under the tooth 279 to block downward movement of the pitmans 189. This prevents the pitmans 189 from engaging the stud 213 (Fig. 21) in the plate 214 when the arms 186 are rocked to ineffective position by the control element on the traveling carriage to select the totalizers for addition in the manner set out above.

The following mechanism is provided to release the "Non-add" key: Connected at 287 to the arm 229 (Fig. 24) is a link 288, the forward end of which is bifurcated to straddle a stud 289 in an arm 293 pivoted on the stud 266. An angular surface 294 of the arm 293 cooperates with a stud 295 in the "Error" key 259. A rearward extension 296 of the link 288 cooperates with a stud 297 in the yoke 281. Clockwise movement of the arm 229, caused by the cam 258 and arm 254 near the end of machine operation, by means of the link 288 rocks the yoke 281 clockwise to disengage the nose thereof from the notch in the "Non-add" key. The "Non-add" key is then spring-returned upwardly to normal position. The "Non-add" key may also be released manually by depressing the error key which by means of the stud 295 rocks the arm 293 clockwise to move the link 288 rearwardly to disengage the nose of the yoke 281 from the notch therein. Rearward movement of the link 288 also rocks the arm 229 clockwise which by means of the latch 250 shifts the release bar 244 rearwardly to provide a means for manually releasing depressed amount keys in the manner set out above.

*Subtract key mechanism*

The subtract function of the instant machine may be initiated either by means of the traveling carriage in columnar positions thereof or by means of a "Subtract" key 259 (Figs. 21, 24, 32 and 34). Depressing the "Subtract" key 259, by means of a link 300, rocks an arm 301 loose on the stud 190, clockwise against the tension of a spring 302 to move an ear 303 thereof out of the path of a tooth 304 on an upward extension of a subtract link 305 the forward end of which is supported in a slot in the comb 193 (Fig. 33). The rearward end of the link 305 is slotted to embrace a stud 306 (Figs. 21 and 30) in an arm 307 loose on a stud 308 in the frame 41. An upward extension of the arm 307 is bifurcated to receive a stud 309 in a bell crank 310 secured to a transfer control shaft 311 journaled in the totalizer frame 202. Secured on the shaft 311 is an arm 312 connected by a link 313 to a transfer segment spring bail 314 pivoted within the totalizer frame 202.

A rearward extension of the arm 301 (Fig. 32) is bifurcated to receive a stud 315 in a latch 316 pivoted at 317 to the frame 41. A downward extension of the latch 316 terminates in a hook adapted to latch under a stud 318 in an arm 319 pivoted at 320 to the link 305. The forward end of the arm 319 is bifurcated to embrace a stud 321 in a balance totalizer engaging pitman 322 which is similar in every respect and functions exactly like the pitman 189 for the #4 totalizer illustrated in Fig. 21 and explained above.

The pitman 322 is connected to an arm 323 turnably supported by a stud 324 in the frame 41. The upper end of the arm 323 is notched to receive a stud 325 in a crank 326 secured to a balance totalizer engaging shaft 327 rotatably supported by the totalizer frame 202. Secured on the shaft 327 are engaging cams 328 which function to engage and disengage the wheels of the balance totalizer with the actuators 122 in exactly the same manner as explained for the cams 206 (Fig. 35) in connection with the No. 4 totalizers. A spring 329 (Fig. 30) urges the link 305 rearwardly to normally maintain a projection 330 thereof against a bushing 340 loose on the stud 308. Clockwise movement of the arm 301 caused by depressing the "Subtract" key rocks the latch 316 counterclockwise to move the hook thereof under the stud 318, as shown in Fig. 34.

A hanging bar 331 (see also Fig. 23) connects the arm 301 to a subtract hanging bar lever 332, supported by the stud 183. The subtract hanging bar lever cooperates with the control element 179 in exactly the same manner as explained for the add levers 182. Consequently when the traveling carriage is tabulated to certain columnar positions, a lug on the control element 179 rocks the lever 332 clockwise to lift the link 331 to rock the arm 301 clockwise to accomplish the same result as depressing the "Subtract" key. Loose on the stud 195 (Fig. 33) is a latch 333 flexibly connected to the lever 194 by a spring 334 which normally maintains a raised surface of said latch in contact with a stud 335 in the lever 194.

At the beginning of subtract operations, counter-clockwise movement of the lever 194 allows the link 305 to be pulled down by a spring in a manner similar to the manner in which spring 222 pulls pitman 189 down, as described above, causing a right angled extension 336 (Figs. 32 and 34) thereof to move into the path of a projection 337 of a totalizer engaging plate 338 loose on the stud 215 and having two rollers 339 which cooperate respectively with the peripheries of companion cams 343 and 344. Downward movement of the link 305 to the position shown in Fig. 34 causes the stud 318 to cooperate with the hook of the latch 316 to rock the arm 319 counterclockwise to lift the pitman 322 to engage a notch 345 therein with a flattened stud 346 in the plate 338. Counterclockwise movement of the lever 194 and the latch 333, as explained above, moves a bent-over ear 347 of said latch upwardly into the path of a tooth 348 on the link 305, when said link has been lowered in the manner explained above.

Prior to initial movement rearwardly of the actuator racks 122, the engaging plate 338 is rocked clockwise by the cams 343 and 344 to shift the link 305 and the pitman 322 forwardly. Forward movement of the link 305 (Figs. 21 and 30) rocks the arm 307 counterclockwise and the bell crank 310, and shaft 311 clockwise to move the add trip pawls 141 (Fig. 12) to ineffective position and to move the subtract trip pawls 142 to effective position. Clockwise movement of the shaft 311 by means of the arm 312 and the link 313 moves the bail 314 clockwise to shift the position of the transfer segment springs so that the transfer segments will be moved in a reverse direction to transfer negative amounts from lower to higher denominations. When the link 305 nears the terminus of its forward movement, as fully shown in the United States patent to Perkins et al., No. 1,679,265, which issued on July 31, 1928, the tooth 348 ratchets over the ear 347 of the latch 333 to retain said link and connected mechanism in moved position after the plate 338 (Fig. 32) has been returned counterclockwise to normal position.

Forward movement of the pitman 322 rocks the arm 323 clockwise to rock the crank 326, the shaft 327 and the engaging plate 328 counterclockwise to engage the wheels of the balance or #1 totalizer with the actuators. Initial movement rearwardly of the actuator racks rotates the wheels of the balance totalizer in a reverse direction to subtract the value of the depressed amount keys therefrom. After the actuator racks have completed their initial movement, the plate 338 is returned counterclockwise to move the pitman 322 rearwardly to disengage the wheels of the totalizer from said actuators. After the transfer has been completed, return movement of the lever 194 (Figs. 33 and 34) and the latch 333 clockwise disengages the ear 347 from the tooth 348 to allow the link 305 to be returned rearwardly to normal position by the spring 329 (Fig. 30). Return movement of the lever 194 likewise lifts the link 305 to disengage the extension 336 from the projection 337 and to disengage the notch 345 in the pitman 322 from the stud 346, thereby restoring said parts to normal position as shown in Fig. 32. The sequence of movements of the stud 346 to engage the totalizer in a subtract operation is known as "subtract timing".

Near the end of a subtract operation the depressed amount keys are released in exactly the same manner as described for adding operations.

*Subtract key releasing mechanism*

Depressing the "Subtract" key 259 (Figs. 24, 32 and 34) moves a notch 349 therein opposite a bent-over extension 350 of a detent 351 slidably mounted by means of slots therein in cooperation with the stud 245 and a stud 342 in an arm 352 loose on the stud 248 secured in the frame 41. The arm 352 is adapted to receive movement at certain times, however, this movement has no connection whatever with the detent 351, said arm serving only as an anchor for said detent. A spring 354 urges the extension 350 into the notch 349 to retain the "Subtract" key depressed during machine operation. Near the end of machine operation, clockwise movement of the arm 229 causes the stud 253 to engage an upward projection 355 of the detent 351 to return said detent rearwardly to normal position. The "Subtract" key is then spring-returned upwardly. Depressing the "Error" key 259 (Fig. 24) also rocks the arm 229 clockwise to release the "Subtract" key.

An interlock is provided between the "Subtract" key and the #1 "Total" key. Depressing the #1 "Total" key 259 (Figs. 32 and 34) moves a notch 356 therein opposite an extension 357 of a detent 358 the forward end of which has a slot which fits loosely over the stud 245. The rearward end of the detent 358 (Fig. 22) is connected to a stud 359 in a total control lever 360, turnably mounted on the stud 248. The detent 358 is spring-urged forwardly to cause the extension 357 to enter the notch 356 to retain the #1 "Total" key depressed. This also causes a hook 361 of said detent to latch over a stud 362 in the "Subtract" key 259 to prevent depression thereof. Depressing the "Subtract" key as illustrated in Fig. 34 moves the stud 362 opposite the nose of the hook 361 to obstruct forward movement of the detent 358 when the #1 "Total" key is depressed.

*Repeat key mechanism*

Adding and subtracting operations may be repeated at the will of the operator. This is accomplished by depressing a "Repeat" key 259 (Fig. 24) which causes the amount keys to remain depressed at the end of machine operation to repeat the amount set upon the keyboard in succeeding operations.

The "Repeat" key 259 has a notch 363 adapted to receive a right-angled extension 364 of a repeat detent 365 with a slot which fits loosely over the stud 245. The rearward end of the detent 365 is connected to the stud 342 in the arm 352. Pivotally connected to the detent 365 is a pawl 366, the bottom surface of which cooperates with a stud 367 in the frame 41. A nose 368 of the pawl 366 cooperates with the lower surface of a forward extension of the latch 250 (see also Fig. 28).

When the "Repeat" key is depressed, a spring (not shown) urges the detent 365 forwardly to cause the extension 364 to enter the notch 363 to retain said key depressed. This forward movement of the detent 365 causes a raised portion of the lower surface of the pawl 366, in cooperation with the stud 367, to lift the nose 368 of said pawl to rock the latch 250 counterclockwise to disengage it from the stud 252 in the arm 229. This prevents the arm 229 from imparting movement to the link 244. Consequently, the depressed amount keys are not released near the end of machine operation and in the succeeding operation the entry of the amount set up on the keys may be repeated.

The "Repeat" key is normally a stay-down key. However, when this key is depressed in conjunction with one of the total keys, it is automatically released at the beginning of the machine operation in a manner later to be described. The "Repeat" key may be manually released by means of the "Error" key 259 (Fig. 24). Depressing the "Error" key causes the roller 295 to engage the rock an arm 369 loose on the stud 266 clockwise.

The arm 369 in cooperation with a stud 370 in the detent 365 returns said detent rearwardly to disengage the extension 364 from the notch 363, thereby allowing the repeat key to be spring-returned upwardly.

Total-taking control mechanism

The total-taking control mechanism is substantially duplicated for each of the four totalizers. It is, therefore felt that an explanation of the total-taking control mechanism in connection with one of the totalizers (No. 4) will be sufficient for the purpose of this specification. The No. 4 total taking control mechanism is shown in normal position in Fig. 29 and in moved position in Fig. 31.

Directing attention to Figs. 21, 29 and 31, a No. 4 "Total" key 259 has a notch 371 arranged to receive a right-angled extension 372 of a detent 373, the forward end of which is slotted to fit loosely over the stud 245. The rearward end of the detent 373 is connected to a total control lever 374 loose on the stud 248 and having an angular surface 375 on an upward extension thereof which cooperates with a stud 376 in the #4 engaging pitman 189. A comb 390 secured to the frame 41 (Figs. 23 and 26) has equally spaced slots adapted to receive the No. 4 total detent 373, similar detents for the other three totalizers, the subtract detent 351 and the repeat detent 365 to aline said detents laterally. Depressing the #4 "Total" key allows a spring 377 to urge the detent 373 forwardly to enter the extension 372 in the notch 371 to retain said key depressed. This forward movement of the detent likewise rocks the lever 374 clockwise causing the angular surface 375 in cooperation with the stud 376 to lift the pitman 189 so that a notch 378 therein is moved into engagement with the stud 346 in the engaging plate 338.

Initial movement clockwise of the plate 338 shifts the pitman 189 forwardly to rock the arm 198 counterclockwise to rock the arm 204, shaft 205 and engaging cams 206 clockwise to engage the wheels of the #4 totalizer with the extensions 139 (Fig. 12) of the actuator racks 122 prior to their initial movement rearwardly. Initial movement rearwardly of the racks and extension turns the wheels of the #4 totalizer to zero and positions the printing segments 44 commensurate with the value on said totalizer wheels. Immediately after the impression is completed and before the racks 122 start their return movement forwardly, the plate 338 (Fig. 29) is returned counterclockwise to shift the pitman 189 rearwardly to normal position to disengage the totalizer wheels from the actuator racks, thereby leaving said wheels standing at zero.

The only difference between a total and a sub-total operation is that in sub-total operations the wheels of the totalizer remain in engagement with the actuator racks during their return movement forwardly and accordingly said wheels are restored to their original condition. The "Sub-total" key 259 (Figs. 29 and 31) has a stud 379 which extends within a slot in the forward end of a link 380 connected to the stud 213 in the engaging plate 214. Depression of the "Sub-total" key moves the link 380 clockwise to latch a notch 381 therein over a stud 382 in the arm 225, as shown in Fig. 31. The "Sub-total" key is retained depressed by means of a nose 383 (Fig. 24) of the pawl 285, which under tension of the spring 284 enters a notch 384 in said sub-total key.

In printing a sub-total of the amount on the No. 4 totalizer, the No. 4 "Total" key and the "Sub-total" key are depressed, and the machine released for operation by depressing the starting bar. Initial movement of the engaging plate 338 moves the pitman 189 forwardly to engage the #4 totalizer wheels with the actuator racks. It will be noted that when the pitman 189 is in its forward position, the stud 376 is out of the path of the upward extension of the lever 374 and the forward edge of said pitman rests on the stud 224 in the lever 225. After the totalizer wheels have been returned to zero and the amount standing on said totalizer wheels has been recorded, initial movement clockwise of the plate 214 moves the link 380 forwardly to rock the lever 225 counterclockwise to disengage the stud 224 from the forward edge of the pitman 189. This allows the pitman, assisted by the spring 222, to drop downwardly until the notch 212 latches over the stud 213, which at this time is alined with said notch. Obviously this disengages the notch 378 from the stud 346 and consequently the plate 338 will make its return movement counterclockwise without disengaging the totalizer wheels from their actuators. Return movement of the actuators 122 (Fig. 12) and their associated extensions 139 then rotates the wheels of the #4 totalizer back to their original position, thus effecting a reading or sub-total operation involving the #4 totalizer.

Clockwise movement of the arm 229 (Figs. 24 and 31) effected near the end of machine operation by the cam 258 and the arm 254, or manually by means of the "Error" key 259 in cooperation with the arm 293 and the link 288, causes the stud 253 to engage an upward extension 385 of the detent 373 to restore said detent and the lever 374 rearwardly to disengage the extension 372 from the notch 371 in the #4 "Total" key, thereby allowing said key to be spring returned upwardly to normal position. Likewise, rearward movement of the link 288, occasioned by the means related above, causes a downward extension 386 thereof in cooperation with a stud 387 in the pawl 285 to rock said pawl clockwise to disengage the nose 383 thereof from the notch 384 in the "Sub-total" key, to allow said key to be spring-returned upwardly.

In order to insure that none of the amount keys are depressed during total and sub-total operations, means rendered effective by depression of any of the total keys is provided to release said amount keys at the beginning of totalizing operations. Such mechanism will now be described.

By referring to Figs. 27, 29 and 31, it will be seen that the detent 373 for the No. 4 "Total" key has a downward projection 388 which cooperates with a stud 389 in a bell crank 393 loose on a stud 394 in the frame 41. A rearward extension of the bell crank 393 is bifurcated to receive a stud 395 in an arm 396 loose on a stud 397 in the arm 247. A spring 398 urges the bell crank 393 counterclockwise to maintain the stud 389 in contact with the projection 388 and to normally maintain the stud 395 out of the path of a nose 399 of an arm 400 loose on the stud 248. The arm 400 carries a roller 401 held in contact with the periphery of a cam 402 secured to the shaft 53, by a spring 403. Depression of the No. 4 "Total" key and resulting forward movement of the detent 373 rocks the bell crank 393 clockwise to lift the stud 395 in the path of the nose 399. Clockwise movement of arm 396 is terminated by a stud 391 therein in cooperation with a raised surface on the arm 247.

Near the beginning of total recording operations the cam 402 rocks the arm 400 counterclockwise, which movement, by means of the stud 395 and the arm 396, is imparted to the arms 247 and 246. This moves the link 244 rearwardly (see also Figs. 2, 24 and 25) to rock the lever 238 clockwise, which by means of the bar 236 imparts clockwise movement to the amount key detent 232 to release any depressed amount keys.

In case the "Repeat" key and a total key are inadvertently depressed at the same time, means are provided to release the "Repeat" key in much the same manner as the amount keys are released at the beginning of total operations. Depressing the "Repeat" key 259 (Figs. 24 and 27) causes the detent 365 to shift forwardly to rock the arm 352 clockwise to move a downward projection 404 thereof into contact with a stud 405 in the arm 247. Therefore, counterclockwise movement of the arm 247, as explained above, by means of the arm 352, returns the detent 365 rearwardly to release the "Repeat" key so that the total operation will prevail.

Counterclockwise releasing movement of the plate 69 (Figs. 1 and 2) by means of an arm 406 rocks a shaft 407 journaled in the frames 40 and 41, clockwise to lock the "Error" key and the "Total" keys against depression after release of the machine for operation. This mechanism forms no part of the instant invention and will not be described herein. For details of this mechanism, see Fig. 23 of the United States patent to Perkins, No. 2,055,703, which issued September 28, 1936.

Overdraft Mechanism

In the instant machine, overdraft operations are controlled by means of an "Overdraft" key 408 (Figs. 1 and 2). The "Overdraft" key is normally locked against depression. However, when an overdraft occurs in the balance totalizer, the "Overdraft" key is unlocked and the No. 1 "Total" key is simultaneously locked against depression. The locking of the No. 1 "Total" key notifies the operator that the balance totalizer is in an overdrawn condition. At this time the operator may pursue either of two courses. The No. 1 "Total" key may be manually unlocked and the balance operation continued, or the "Overdraft" key may be depressed to release the machine for an overdraft operation in which the complementary amount of the overdraft is transposed to a true negative amount and recorded. The overdraft mechanism used in the machine of this invention is basically the same as that illustrated and described in co-pending application for United States Letters Patent of Charles L. Lee, filed April 14, 1932, Serial Number 605,160, which issued on May 4, 1937, as Patent No. 2,079,355. However, installation of the rotary drive shaft necessitated numerous changes in the overdraft mechanism in order to adapt it for use in the present machine. Therefore all the new mechanism and all the mechanism affected by the installation of the rotary drive shaft will now be described in detail and description of the overdraft mechanism not explained herein may be had by referring to the patent mentioned above.

Directing attention to Figs. 1, 2, 3 and 5, the "Overdraft" key 408 is composed of two parts, an upper part or stem 409 and a lower part or pitman 410. The stem 409 is slidably mounted by means of the upper end thereof which extends through an opening in the auxiliary keyboard plate 90 and a slot in the lower end which fits loosely over a stud 411 secured in the frame 40. The pitman 410 is mounted to slide in harmony with the stem 409 by means of slots in said pitman in cooperation with the stud 411 and a stud 412 carried by an auxiliary plate 413 secured to the frame 40. The stem 409 is normally connected to the pitman 410 by means of a latch 414 pivotally connected to said stem and having an ear 415 which is urged into engagement with a notch in said pitman by means of a spring 416 which also urges the stem upwardly to normally maintain a shoulder thereof in contact with the lower surface of the plate 90. In case the overdraft key is inadvertently retained depressed at the end of an overdraft operation, mechanism presently to be described rocks the latch 414 counterclockwise to disengage the ear 415 from the pitman 410 to allow said pitman to return to normal position independently of the stem 409.

A spring 417 urges the pitman 410 upwardly to normally maintain an upward extension 418 thereof in contact with the lower surface of the plate 90. A link 419 is connected at its upper end to the pitman 410 and is slotted at its lower end to receive the stud 75 in the releasing lever 66.

When the No. 1 totalizer is not overdrawn, the overdraft key 408 is locked against depression. This is accomplished by means of a latch 420 (Figs. 8 and 9) loose on the stud 411, said latch having a notch in an upward extension thereof, which, in cooperation with a bent-over extension 321 of the pitman 410, blocks downward movement of said pitman. The latch 420 is connected by a link 422 to an arm 423 secured to an overdraft shaft 424 journaled in the totalizer frame 202. When an overdraft occurs, the shaft 424 is rocked a slight distance clockwise, which, by means of the arm 423 and link 422, imparts counterclockwise movement to the latch 420 to disengage the notch therein from the extension 421 to unlock the overdraft key. The manner in which the overdraft shaft is restored counterclockwise to normal position will be explained later herein.

The overdraft shaft 424 (Figs 21 and 23), has secured to its left end an arm 425 connected by a link 426 to pitman 427 which is in turn connected to the upper end of a latch 428 loose on a stud 429 in the frame 41. Movement imparted to the shaft 424 which is clockwise as viewed in Fig. 8, and counterclockwise as viewed in Figs. 21 and 23, by means of the arm 425, link 426, and pitman 427, rocks the latch 428 counterclockwise to cause a bent-over ear thereof to enter a notch in the stem of the No. 1 "Total" key to lock said key against depression when the balance totalizer is overdrawn.

The functioning of the balance totalizer and of the auxiliary differential is controlled in overdraft operations by means of a cluster of cams driven by means of a pinion 430 (Figs 1, 2 and 5) secured to the shaft 53 and connected by a pinion 431 rotatably mounted on the plate 413 to an overdraft drive gear 432 loose on the stud 67 in the frame 40. The ratio between the gear 432 and the pinion 430 is such that one revolution of the shaft 53 in a counterclockwise direction rotates the gear 432 one-third of a counterclockwise revolution. Secured to the gear 432 is a collar 434 (Figs. 5 and 7) with three equally spaced notches adapted to cooperate with the tooth 435 of a pawl 436 pivotally connected to a disk 437 assembled with a plurality of overdraft control cams which form a cluster 438 rotatably supported by the stud 67. It is therefore obvious that in overdraft operations, which consist of three cycles of movement of the machine operating mechanism, the gear 432 will make one counterclockwise revolution. The disk 437 and its associated cams are assisted to and maintained in home position by means of a lever 439 (Fig. 1) pivoted on the rod 123 and carrying a roller 440 which is urged into cooperation with a V-notch in the disk 437 by a spring 441.

When the "Overdraft" key 408 (Fig. 5) is in undepressed position, a camming surface on a projection 442 of the pitman 410 engages a tail 443 of the pawl 436 to maintain said pawl disengaged from the notches in the collar 434. Consequently, during regular machine operations the gear 432 and collar 434 rotate idly without imparting any movement to the cam cluster 438. Depressing the "Overdraft" key allows a spring 444, assisted by an angular extension 445 of the pitman 410, to rotate the pawl 436 counterclockwise to engage its tooth 435 with one of the notches in the collar 434. Also depression of the "Overdraft" key by means of the link 419, (Fig. 3) rotates the release lever 66 to release the machine for operation in the manner previously explained.

In order to insure that the machine operates through three cycles in overdraft operations, the "Overdraft" key is retained depressed by locking mechanism presently to be described and a finger 450 of the link 419 moves in the path of an abrupt surface 446 of the non-repeat latch 87 to prevent the functioning of said latch while the overdraft key is depressed.

Mechanism for locking the "Overdraft" key depressed consists of a latch 447 (Figs. 8 and 9) loose on the stud 411 and having a stud 460 to which is connected one end of a link 448. The other end of the link 448 is connected to a bell crank 449 loose on a rod 123 which also rotatably supports the lever 439 (Fig. 1). The bell crank 449 carries a roller 451 adapted to cooperate with the periphery of a cam 452 which is a part of the cluster 438. A spring 453 urges the bell crank 449 clockwise which by means of the link 448 also urges the latch 447 clockwise to maintain a projection 454 thereof in contact with the inner surface of the extension 421 of the pitman 410. Depression of the "Overdraft" key 408 allows the latch 447 to hook over the top edge of the extension 421 to lock said "Overdraft" key depressed during overdraft operations. Near the end of an overdraft operation a node 455 of the cam 452 in cooperation with the roller 451 rocks the bell crank 449 counterclockwise to disengage the latch 447 from the extension 421 to allow the overdraft key to be restored upwardly by the spring 417 (Fig. 5).

In case the overdraft key 408 (Figs. 8, 9 and 10) is retained depressed the stud 460 engages an extension 461 of the latch 414 to rock said latch counterclockwise to disconnect the finger piece or stem 409 from the pitman 410 to allow said pitman to return to normal position independently of said stem as previously explained.

It will be recalled by referring to Fig. 8 that an overdraft causes the overdraft shaft 424 to receive clockwise movement to unlock the "Overdraft" key. The manner in which the overdraft shaft is restored to normal position and the latch 420 is returned to locking position will now be described. Turnably mounted on the latch 420 (Fig. 9) is a pawl 456 with a tooth 457 urged clockwise into communication with a similar tooth 458 on the latch 447, by a spring 459. Counterclockwise releasing movement of the latch 447 causes the tooth 458 to move beyond the tooth 457; therefore when the spring 453 (Fig. 8) returns the bell crank 449 and the latch 447 clockwise, the latch 420 by means of the pawl 456 moves in unison with said latch and by means of the link 422 and arm 423 restores the overdraft shaft 424 counterclockwise to normal position. The pawl 456 remains engaged with the tooth 458 until in a subsequent operation upward movement of the arm 112 (Figs. 8, 9 and 11) causes a stud 463 therein to engage a tail 464 of the pawl 456 to disengage said pawl from the tooth 458, leaving said parts in their normal positions as shown in Fig. 9.

As previously stated, it is necessary to disable the printing mechanism during the first two cycles of overdraft operations in order to prevent complementary overdraft entries from being made upon the record material. The mechanism for accomplishing this result is shown in Figs. 8 and 11, and will now be described.

A link 465, the forward end of which is loose on the stud 463, connects the link 112 to an upward extension of a lever 466 loose on the rod 123. The lever 466 carries rollers 467 and 468 which cooperate respectively with companion cams 469 and 470 which form an integral part of the assembly 438, see also Figs. 5 and 7. At the beginning of an overdraft operation the cams 469 and 470 rock the lever 466 counterclockwise which by means of the link 465 moves the link 112 clockwise to disengage the notch therein from the stud 111 in the cam lever 110 and to engage another notch 471 in said link with a stationary stud 472 to secure the printing mechanism in ineffective or home position during the first and second cycles of an overdraft operation. At the beginning of the third cycle of an overdraft operation the cams 469 and 470 return the lever 466 clockwise to reengage the link 112 with the stud 111 so that the printing mechanism will function to print the true negative amount of the overdraft.

*Auxiliary differential*

As previously stated, the machine of this invention has an auxiliary differential into which the complementary overdraft is temporarily transferred when the balance totalizer is cleared in the first cycle of an overdraft operation. In the second cycle of an overdraft operation the cleared balance totalizer is selected for a subtract operation and the wheels of the auxiliary differential control the movement of the actuator racks 122 (Fig. 12) in their initial movement rearwardly, consequently the complementarp amount of the overdraft is subtracted from the cleared No. 1 or balance totalizer. It is obviously apparent that this results in the true negative amount of the overdraft being stored in the No. 1 totalizer.

Referring to Figs. 12, 14 and 15, the auxiliary differential has a wheel 473 for each denomination of the machine. Each of these wheels is adapted to cooperate with an auxiliary rack 474 secured to the corresponding denominational actuator rack 122. The auxiliary differential wheels 473 are loosely supported in a rockable frame 475, opposite ends of which terminate in arms 476 loosely mounted on the rod 123. Each of the arms 476 carries a roller 477 embraced by camming slots in two symmetrical arms 478 secured at opposite ends of the engaging shaft 63 journaled in the frames 40 and 41. Secured on the righthand end of the shaft 63 is a crank 480 with a roller 481 adapted to cooperate with the periphery of a plate cam 482 which forms an integral part of the cluster 438 which, as previously stated, makes one counterclockwise revolution each overdraft operation. Springs 483 connected to the arms 478 urge said arms and the shaft 63 clockwise to maintain the roller 481 in contact with the periphery of the cam 482.

Before explaining the manner in which the auxiliary differential functions it will probably be advantageous to describe the mechanism that controls the functioning of the balance totalizer in overdraft operations.

*Control of the balance totalizer in overdraft operations*

Mechanism to control the functioning of the balance totalizer during overdraft operations will now be described.

Loose on the rod 123 (Fig. 10) is a bell crank 484 with a roller 485 which is urged by a spring 487 into communication with the periphery of a cam 486 assembled with the cluster 438. The bell crank 484 is connected by a link 488 to a crank 489 secured on the righthand end of a control shaft 493 journaled in the frames 40 and 41. Secured on the lefthand end of the shaft 493 (Figs. 10, 22 and 23) is an arm 494 with a stud 495 embraced by the bifurcated end of a link 496 the rearward end of which is connected to a downward extension on the No. 1 control lever 360. The stud 495 (see also Figs. 21, 32 and 34) is embraced by the hook-shaped forward end of a subtract control link 497 the rearward end of which is connected to an upward extension of the subtract control arm 301. The stud 495 is likewise embraced by the hook-shaped forward end of an add control link 498 similar to the link 497, the rearward end of said link 498 being connected to a No. 2 add control arm 499 which controls the adding function of the No. 2 totalizer in exactly the same manner as the arm 186 (Fig. 21) controls this function in the No. 4 totalizer.

Figure 22:
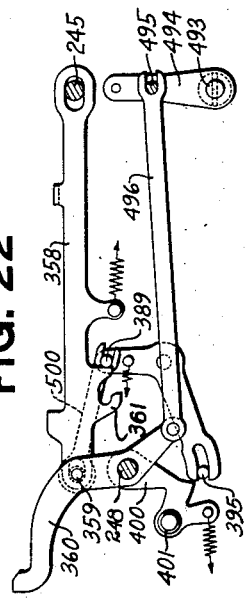
Fig. 22 is a detail of a portion of the key releasing mechanism.

In the beginning of the first cycle of an overdraft operation, counter-clockwise movement of the cam 486 (Fig. 10) allows the spring 487 to rock the bell crank 484 clockwise which by means of the link 488 rocks the shaft 493 and the arm 494 also clockwise as here viewed and counter-clockwise as viewed in Figs. 22, 21 and 23. This movement of the arm 494 by means of the link 496 rocks the lever 360 clockwise as viewed in Fig. 22 to move the pitman 322 (Figs. 32 and 34) upwardly into engagement with the stud 346 in the engaging plate 338 to select the No. 1 totalizer for a total operation in exactly the same manner as explained for the No. 4 totalizer.

Clockwise movement of the engaging plate 338 engages the wheels of the No. 1 totalizer with the actuator racks 122 (Fig. 12) prior to their initial movement rearwardly. Initial movement of the racks 122 rotates the No. 1 totalizer wheels reversely to zero to position said actuator rack commensurate with the amount thereon. Upon completion of the rearward movement of the racks 122 the wheels 473 of the auxiliary differential 475 are moved into engagement with their corresponding auxiliary racks 474. This is accomplished by means of the cam 482 (Figs. 14 and 15) counterclockwise movement of which rocks the arm 480 in cooperation with the roller 481 rocks the arm 480, shaft 63, and engaging arm 478 counterclockwise. The configuration of the cam slots in the arms 478 in cooperation with the rollers 477 rocks the auxiliary differential upwardly or counterclockwise to engage the wheels 473 with the auxiliary racks 474. The wheels of the auxiliary differential have positive stops that locate them in zero position and these wheels are always standing at zero prior to their engagement with the auxiliary racks 474. After the wheels of the No. 1 or balance totalizer have been turned to zero by initial movement of the racks 122, return movement of the plate 338 (Fig. 32) disengages said totalizer wheels from said actuator racks. Return movement forwardly of the racks 122 in the latter part of the first cycle of an overdraft operation rotates the auxiliary differential wheels 473 to transfer the complementary amount of the overdraft from the No. 1 totalizer to the auxiliary differential.

Due to the fact that the detent 358 (Fig. 22) and the No. 1 "Total" key receive no movement in overdraft operations it is necessary to employ a link 500 loose on the stud 359 in the lever 360 and bifurcated to receive the stud 389 in the bell crank 393 so that clockwise movement of the lever 360 will be transmitted to the bell crank 393 to move the stud 395 (see also Fig. 27) into the path of the lever 400 to cause any depressed amount keys to be released in the previously described manner, at the beginning of an overdraft operation.

By observing Fig. 10 it will be understood that the shaft 493 and associated parts have three positions, a neutral or home position in which said parts are here shown, a rearward or clockwise position to select the balance totalizer for total operations, and a forward or counterclockwise position to which a raised portion 501 of the cam 486 rocks said parts in the beginning of the second cycle of an overdraft operation. This shifts the links 497 and 498 forwardly (Figs. 21 and 23) to rock the subtract control arm 301 (Fig. 32) for the balance totalizer and the add control arm 499 for the No. 2 totalizer to respectively select said totalizers for subtract and adding operations.

In the second cycle of an overdraft operation, initial movement rearwardly of the actuator racks 122 rotates the wheels of the auxiliary differential which are still engaged with the auxiliary racks 474 back to zero position. It is apparent that at this time the auxiliary differential controls the positioning of the actuator racks 122. Therefore the complementary amount of the overdraft which was stored in the auxiliary differential will be subtracted from the cleared balance totalizer and simultaneously added in the No. 2 totalizer. It is therefore clear that at the end of the second cycle of an overdraft operation the true negative amount of the overdraft will remain in the balance totalizer. Prior to return movement forwardly of the actuator racks 122 the wheels of the auxiliary differential which are now standing at zero, are disengaged therefrom.

It is to be understood that the adding of the complementary amount of the overdraft during the second cycle of an overdraft operation is not limited to the No. 2 totalizer but this amount may be added into any one or as many of the totalizers as desired. This may be accomplished by connecting the link 498, Fig. 23, to the desired add control arm or arms.

A link 501 (Figs. 10 and 21) is hook-shaped on both ends to fit over a stud 502 in the arm 494 and the stud 389 in the bell crank 393. This link provides a means of transmitting the clockwise movement of the arm 494 as observed in Fig. 21 to the bell crank 393 to cause any depressed amount key to be released at the beginning of the second cycle of an overdraft operation.

In the third cycle of an overdraft operation the cam 486 (Fig. 10) again selects the No. 1 or balance totalizer for a total operation. It will be recalled that the mechanism illustrated in Fig. 11 connects the printer actuating mechanism to its operating lever 110 at the beginning of the third cycle of operation. Therefore in this final cycle of an overdraft operation the No. 1 or balance totalizer is cleared and the true negative amount of the overdraft is printed upon the record material.

It is felt that a clear understanding of the operation of the machine will have been obtained from the preceding specification, and for this reason no description of operation in connection with a particular business system has been included herein. However, the machine of the instant invention is very flexible in nature and may with minor adjustments and changes be adapted for use in the majority of present day businesses.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described having a traveling carriage, the combination of a rotary drive shaft; a member operated by the shaft; a piece resiliently urged into cooperation with the member; means to normally retain the piece in neutral position; a regularly excursioned element also normally retaining said piece and adapted to allow the piece to engage the member when the first mentioned retaining means is moved to ineffective position; and means whereby the traveling carriage moves the first mentioned retaining means to ineffective position.

2. In a calculating machine, the combination with a traveling carriage, a totalizer and actuators for the totalizer; of a rotary drive shaft; a member operated by the shaft; an element cooperating with the member and adapted to engage the totalizers with the actuators; means to normally retain the element in neutral position; a regularly excursioned member operated by the rotary shaft to control the positioning of the element to allow the element to engage the member when the retaining means is moved to ineffective position; and means actuated by the traveling carriage to move the retaining means to ineffective position.

3. In a calculating machine, the combination with a traveling carriage, a totalizer and actuators for the totalizer; of a rotary drive shaft; a member operated by the shaft; an element operated by the shaft; a piece cooperable with the member and the element, said piece adapted to engage the totalizer with the actuators; means to normally retain the piece in neutral position; means also controlling the positioning of said piece and operated by the shaft to permit the engagement of the piece with the member when the retaining means is ineffective; means actuated by the traveling carriage to render the retaining means ineffective; means to engage the piece with the element irrespective of the effectiveness of the retaining means; and means to control the latter engaging means.

4. In a machine of the class described, the combination with a totalizer, actuators for the totalizer, and means to engage the totalizer with the actuators; of a rotary drive shaft; a member operated by the shaft; an element to connect the engaging means with the member; means to normally maintain the element in a neutral position; control means; means to enable the control means to engage the member for operation thereby; means to render the enabling means effective; and means operated by the control means to move the element into engagement with the member.

5. In a machine of the class described, having a balance totalizer, actuators for the totalizer, and transfer means for the totalizer adapted to be shifted from adding to subtracting position, the combination of a rotary drive shaft; a member operated by the shaft; an element cooperating with the member to engage the totalizer with the actuators; a piece cooperating with the member to shift the transfer means from adding to subtracting position; means to retain the piece in neutral position; means to disable the retaining means; means also controlling the position of the piece and operated by the shaft to permit engagement of the piece with the member when the retaining means is disabled; and means whereby the piece moves the element into engagement with the member.

6. In a machine of the class described, the combination with a balance totalizer, actuators for the totalizer, means to engage the totalizer with the actuators, and means to transfer tens from lower to higher denominations, said transfer means adapted to be shifted from adding to subtracting position; of a rotary drive shaft; a member operated by the shaft; an element to connect the engaging means to the member; means to shift the transfer mechanism; means to connect the transfer shifting means to the member; means to engage the connecting means for the transfer shifting means with the member; means to retain the connecting means for the transfer shifting means ineffective irrespective of the engaging means; a plurality of means to control the retaining means; and means rendered effective by movement of the transfer connecting means into engagement with the member when the retaining means is disabled to operatively connect the element to the member.

7. In a machine of the class described, the combination with a balance totalizer, actuators for the totalizer, and transfer means for the totalizer, adapted to be shifted from adding to subtracting position; of means including a member to engage the totalizer with the actuators; means including an element to shift the transfer means; means connecting the member and the element in such a way as to normally allow independent movement of said member and element; and means cooperating with the connecting means to cause movement of the member in subtracting operations to depend upon movement of the element.

8. In a machine of the class described, having a balance totalizer, actuators for the totalizer, and transfer means adapted to be shifted from adding to subtracting position, the combination of means to engage the totalizer with the actuator; means to shift the transfer means; means connecting the engaging and the shifting means, said connecting means adapted to normally allow independent movement of said engaging and shifting means; means cooperating with the connecting means to cause movement of the shifting means to subtracting position to move the engaging means to subtracting position; and means to control the connecting means.

9. In a machine of the class described, having a balance totalizer, actuators for the totalizer, and transfer means adapted to be shifted from adding to subtracting position, the combination of means to engage the totalizer with the actuators; means to shift the transfer means; means connecting the engaging and the shifting means in such a manner as to allow independent movement of said engaging and shifting means; means to operate the engaging and the shifting means; and an element cooperating with the connecting means so that movement of the shifting means into engagement with the operating means connects the engaging means to the operating means.

10. In a machine of the class described, the combination with a balance totalizer, actuators for the totalizers, and transfer means adapted to be shifted from adding to subtracting position; of means to engage the totalizer with the actuators; means to shift the transfer means; means connecting the engaging and the shifting means in such a manner as to normally allow independent movement of said engaging and shifting means; means to operate the engaging and the shifting means; an element cooperating with the connecting means so that movement of the shifting means into engagement with the operating means connects the engaging means to the operating means; and a plurality of means to control the element.

11. In a machine of the class described, the combination with a balance totalizer, means to actuate the totalizer, and means to engage the totalizer with and disengage the totalizer from the actuators; of means to operate the engaging means in one direction; means to operate the engaging means in another direction; means including a shiftable member for connecting the engaging means to the operating means; and means to shift the member from the first operating means to the second operating means during a machine operation.

12. In a machine of the class described, the combination with a balance totalizer, means to actuate the totalizer; of means to engage the totalizer with the actuators; means to disengage the totalizer from the actuators; means connecting either the engaging or disengaging means to the totalizer; means operated by the disengaging means to allow the connecting means to be shifted from the engaging means to the disengaging means; means to shift the connecting means; and means to control the operation of the means which is operated by the disengaging means to allow the connecting means to shift.

13. In a machine of the class described, the combination with a balance totalizer, means to actuate the totalizer, and the means to shift the totalizer into and out of engagement with the actuators; of means to operate the shifting means in one direction to engage the totalizer with the actuators; means to operate the shifting means in another direction to disengage the totalizer from the actuators; means to connect either operating means to the shifting means; a manipulative member; an element connecting the latter operating means to the manipulative member; and means rendered effective by the element under the influence of the manipulative member to cause the connecting means to shift from the first operating means to the second operating means.

14. In a calculating machine the combination with a balance totalizer, means to actuate the totalizer and means to shift the totalizer into and out of engagement with the actuators; of means to operate the shifting means in one direction to engage the totalizers with the actuators; means to operate the shifting means in another direction to disengage the totalizers from the actuators; means to connect either operating means to the shifting means; means to engage the connecting means with the first operating means; an element connected to the second operating means; a member operated by the element to cause the connecting means to be disengaged from the first operating means and engaged with the second operating means during machine operation; and means cooperating with the element to control the operation of the member.

15. In a calculating machine the combination with a balance totalizer, means to actuate the totalizer, and means to shift the totalizer into and out of engagement with the actuators; of means to operate the shifting means in one direction to engage the totalizers with the actuators; means to operate the shifting means in another direction to disengage the totalizers from the actuators; means to connect either operating means to the shifting means; and a member cooperating with the connecting means; manipulative means; an element connected to the second operating means and the manipulative means, and adapted to be engaged with the member by the manipulative means to cause the connecting means to be disengaged from the first operating means and engaged with the second operating means during machine operation.

16. In a machine of the class described, the combination with a balance totalizer, and means to actuate the totalizer, of means to engage the totalizer with the actuators; means to operate the engaging means in one direction; means to operate the engaging means in another direction; means to couple the engaging means to the various operating means; means to operate the coupling means to couple the engaging means to the first operating means; control means to control the engagement of the coupling means and the operating means during a machine operation; means operable by the second operating means and connectable to the control means; and means for connecting the means operable by the second operating means to the control means to operate the control means to allow the coupling means to shift from engagement with the first operating means to the second operating means.

17. In a machine of the class described, the combination with a balance totalizer, means to actuate the totalizer, and totalizer engaging means to engage and disengage the totalizer and the actuating means, of means to operate the engaging means in subtract timing; means to operate the engaging means in add timing; shiftable coupling means to selectively connect the engaging means to the operating means; and means to control the shifting of the coupling means from the subtract timing operating means to the add timing operating means during a machine operation.

18. In a machine of the class described, the combination with a balance totalizer, actuating means therefor, and totalizer engaging means for engaging the totalizer with the actuators, of means to operate the engaging means to engage the totalizer at proper times for subtracting operations; means to operate the engaging means to engage the totalizer at proper times for adding operations; a member for selectively connecting the engaging means with either operating means; means operable in total taking operations to move the member into engagement with the first mentioned engaging means operating means; means to retain the member in engagement with the first mentioned operating means during the machine operation; and means operable in a subtotal operation for releasing the retaining means to allow the member to be released from the first mentioned engaging means operating means and to engage the second mentioned engaging means operating means.

19. In a machine of the class described, the combination with a balance totalizer, actuating means therefor, and totalizer engaging means for engaging the totalizer with the actuators, of means to operate the engaging means in one direction; means to operate the engaging means in another direction; coupling means selectively engageable with the operating means to connect the operating means to the engaging means; means to move the coupling means into engagement with the first mentioned operating means; means to retain the coupling means in engagement with the first mentioned operating means during a machine operation; and means operable by the second mentioned operating means for releasing the retaining means to allow the coupling means to shift from engagement with the first mentioned operating means and to engage the second mentioned operating means during the machine operation.

20. In a machine of the class described, having a balance totalizer, actuating means therefor, and totalizer engaging means for engaging the totalizer with the actuators, the combination of means operable to actuate the totalizer engaging means in subtract timing; a member operable to connect the engaging means to the engaging means actuating means; subtraction control means including an element engageable with the engaging means actuating means for operation thereby; and a lever operable by said element to cause the member to shift into engagement with the engaging means actuating means; and a total control means, operable independently of the subtraction control means, for shifting the member into engagement with the engaging means actuating means.

LEEFE JANE LEE,
*Executrix of the Estate of Charles L. Lee, Deceased.*